Sept. 27, 1949.   H. G. HOULTON   2,483,282
ART OF GREASE MANUFACTURE
Filed Sept. 15, 1945   17 Sheets-Sheet 1
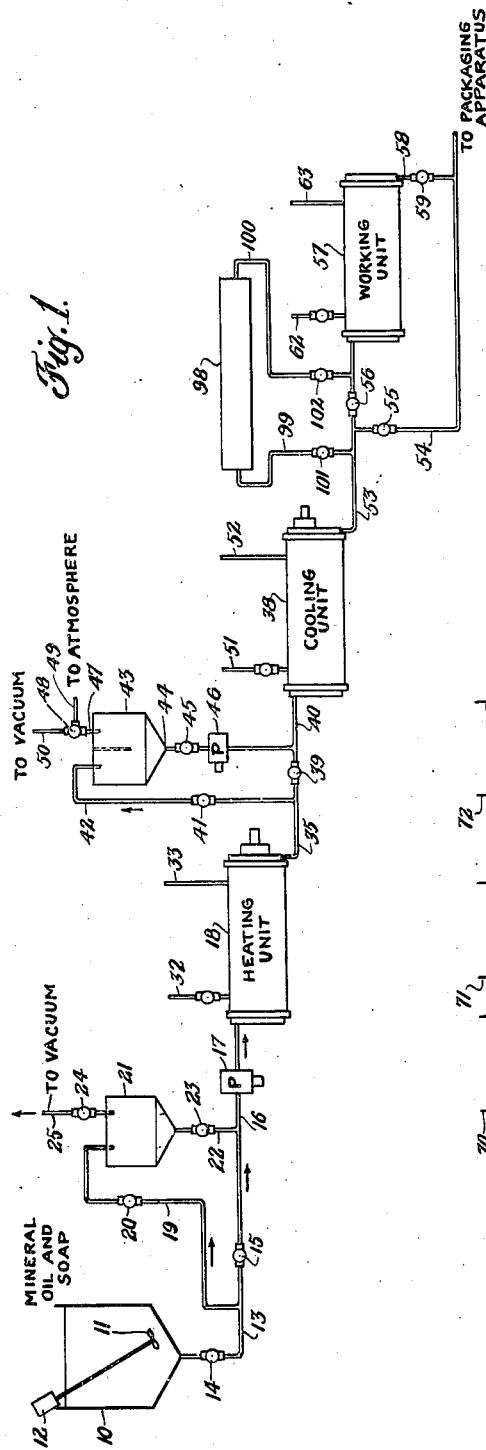
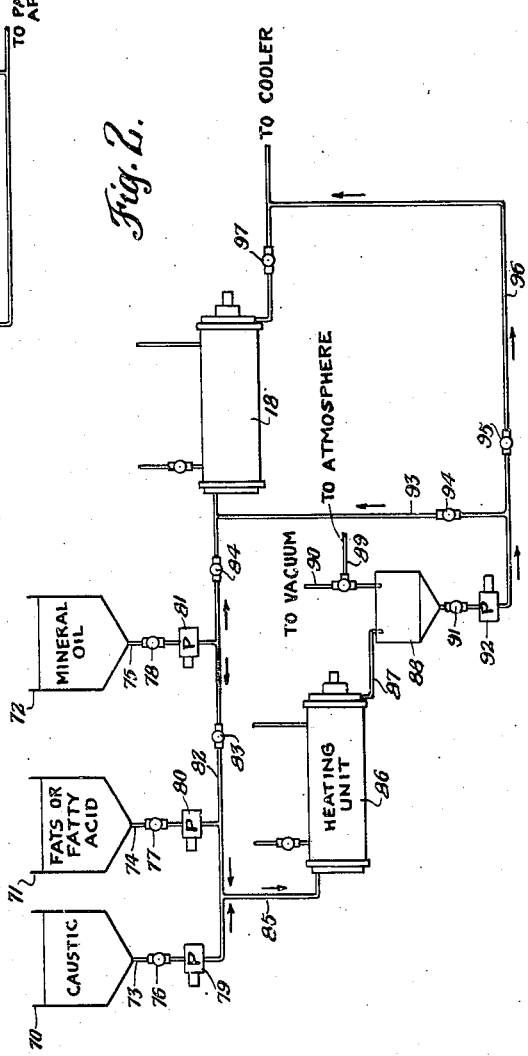
INVENTOR
H. G. Houlton
BY
ATTORNEY Sept. 27, 1949.   H. G. HOULTON   2,483,282
ART OF GREASE MANUFACTURE
Filed Sept. 15, 1945   17 Sheets-Sheet 2
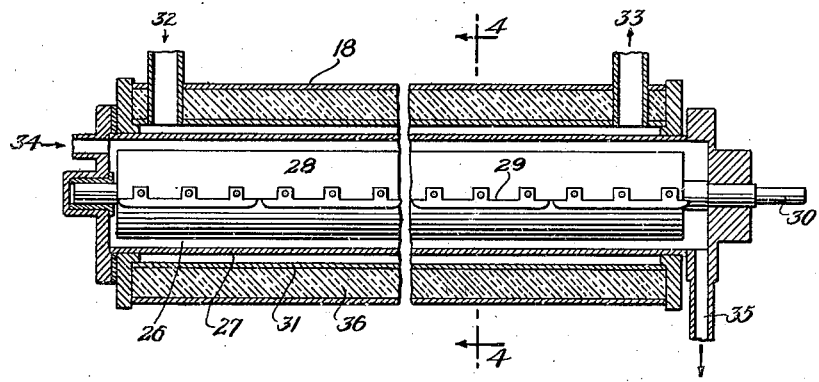
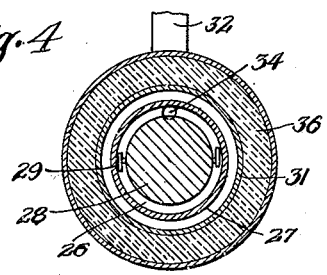
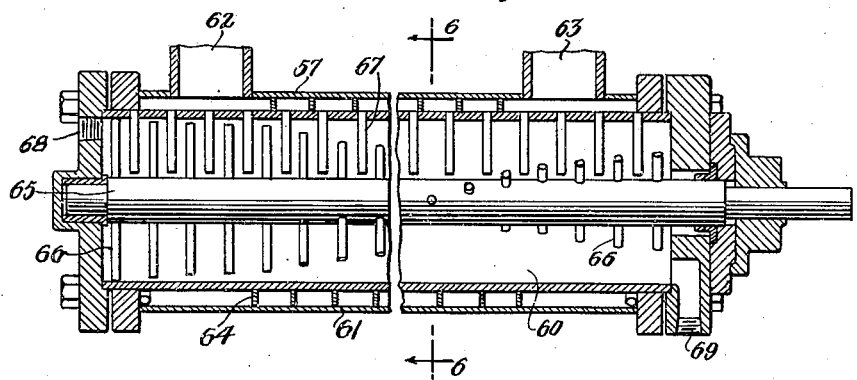
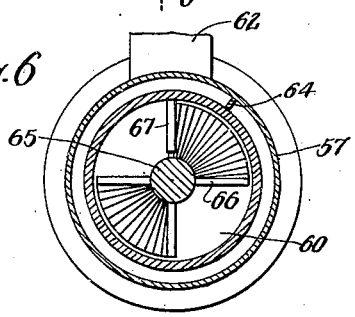
INVENTOR
H. G. Houlton
BY
ATTORNEY

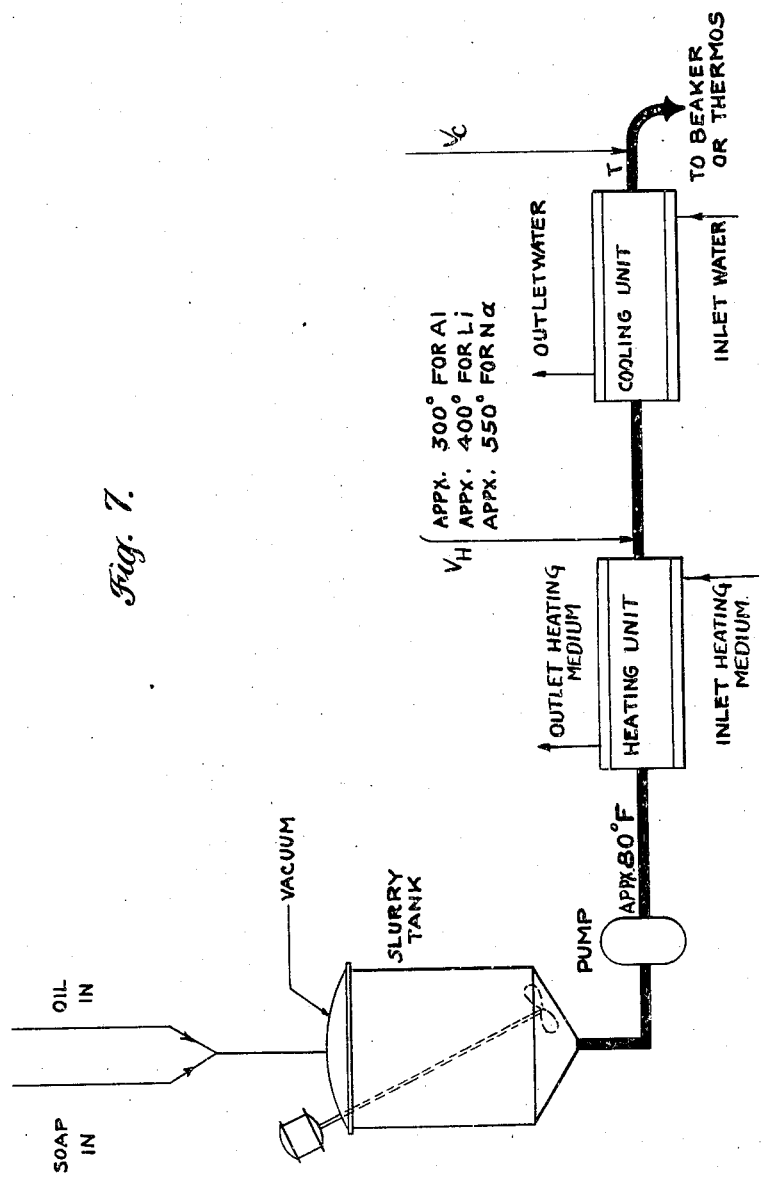

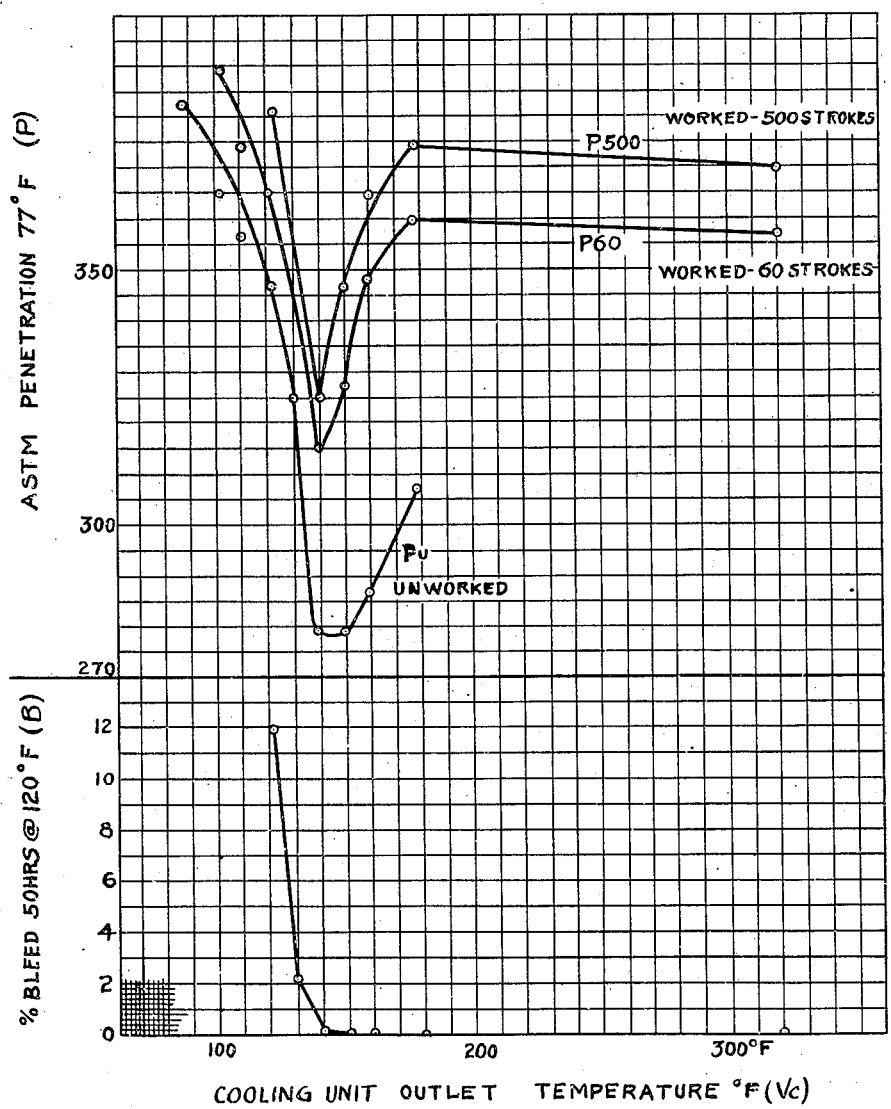

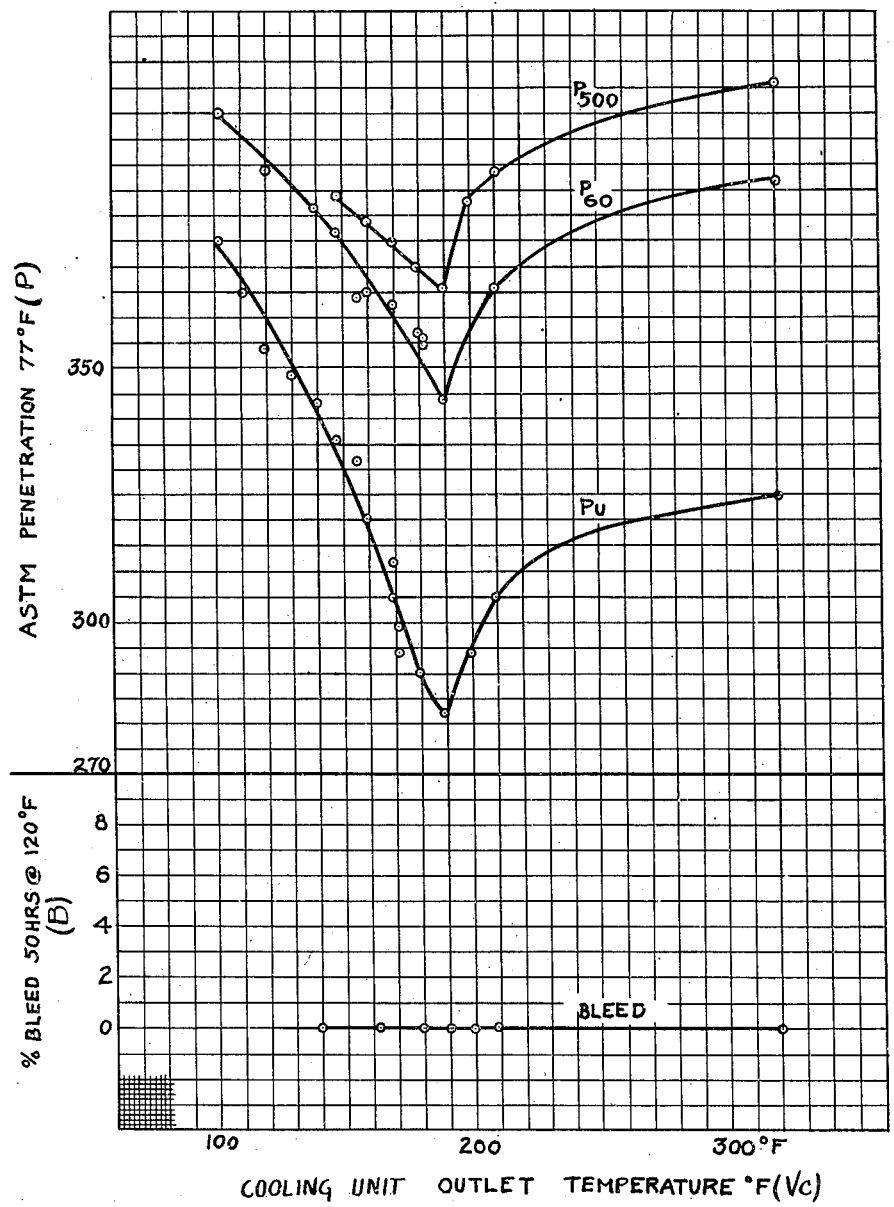

Sept. 27, 1949.                  H. G. HOULTON                         2,483,282
                              ART OF GREASE MANUFACTURE
Filed Sept. 15, 1945                                              17 Sheets-Sheet 14

INVENTOR
H. G. Houlton
BY
ATTORNEY

Sept. 27, 1949.   H. G. HOULTON   2,483,282
ART OF GREASE MANUFACTURE
Filed Sept. 15, 1945   17 Sheets-Sheet 15

Sept. 27, 1949.　　　　　H. G. HOULTON　　　　　2,483,282
ART OF GREASE MANUFACTURE
Filed Sept. 15, 1945　　　　　　　　　　　　　　17 Sheets-Sheet 16

Sept. 27, 1949.    H. G. HOULTON    2,483,282
ART OF GREASE MANUFACTURE
Filed Sept. 15, 1945    17 Sheets-Sheet 17

Patented Sept. 27, 1949

2,483,282

UNITED STATES PATENT OFFICE 2,483,282

ART OF GREASE MANUFACTURE

Harold G. Houlton, Louisville, Ky., assignor to The Girdler Corporation, Louisville, Ky., a corporation of Delaware Application September 15, 1945, Serial No. 616,589

9 Claims. (Cl. 252—32)

This invention relates to the art of manufacturing grease from mineral oil, or other suitable lubricating vehicle, and soap, wax or other suitable stiffening agent, either pre-made or made in situ as part of the process, and the preset application is a continuation-in-part of my copending application Serial No. 513,690, filed December 10, 1943, subsequently issued on March 16, 1947, as Patent No. 2,417,495. The nature, objects and advantages of the prsent invention will be best understood from the following brief statement of customary grease-making practice and the ensuing description of my invention. For purposes of conveying a complete understanding of my invention, I will describe the same hereinafter as applied particularly to the manufacture of grease from mineral oil and soap, but it is to be understood that the invention also is applicable to the manufacture of grease from other forms of lubricating vehicles and stiffening agents having the required properties and wherein similar problems and conditions are encountered.

The soap and oil are brought together in grease making proportions in the presence of heat, whereby the soap is put into solution in the oil, producing a hot grease. Various procedures may be followed. For example, the ingredients may be mixed and then heated, may be simultaneously mixed and heated, or individually preheated and then mixed. The process may be batch-wise or continuous in nature.

The hot grease thus obtained is cooled so that it may gel. The cooling may be done while agitating, and it has been proposed in some cases to cool to near what is called the "transition" temperature, particularly with greases that require appreciable time for gelation. The "transition" temperature is the temperature at which the soap is no longer soluble in the oil (i. e., soap fibers commence to grow) and the grease changes from a stringy nature to a gel. In other words, the "transition" temperature is the temperature above which the hot grease will not change to a gel form, but at which temperature it will change to gel form.

The cooling has been stopped short of the transition temperature because the agitation of the grease at the transition, i. e., gelling temperature, detrimentally affected the end product by imparing the gel structure, causing, for example, bleeding of the oil out of the gel latticework. Thus, using, by way of illustration, a hard grease (as distinguished from a semi-fluid grease) requiring a period of time for gelation, it has been proposed to cool the grease down to from about 10° F. to about 5° F. above the transition temperature and then to transfer it to the gelation vessel in which the grease is allowed quietly to gel. By this procedure it was ensured that the grease would reach the gelation vessel at or below the transition, i. e., gelation temperature, and that there would be no agitation during the transition.

I have surprisingly discovered that if the grease be cooled, with agitation, substantially below the transition temperature and to the "critical" temperature hereinafter defined, no detrimental consequences follow, but, to the contrary, optimum results are obtained for a given amount of soap, providing the cooling be sufficiently rapid, particularly from the transition temperature to the critical temperature. Thus, again using a hard grease by way of illustration, I have discovered that if the grease be so cooled, considerably greater hardness may be obtained for a given content of soap, or, vice versa, for a given hardness, considerably less soap is required. For example, with a grease for which 10% soap was heretofore required to obtain a given hardness, I have obtained the same hardness with 6% soap, i. e,. I obtain the maximum "yield." Since the per lb. cost of soap is the great single cost item of the ingredients, this represents a very large economy.

Stated in another way, and as will further appear, by my invention the penetration (i. e., hardness) curve of a hard grease drops sharply from the transition temperature to the critical temperature, giving, as stated, greatly increased hardness for a given soap content. If the cooling, with agitation, be continued below the critical temperature, the penetration curve sharply rises, even though the cooling is rapid.

The case with semi-fluid greases is substantially the same. Semi-fluid greases usually require considerably less soap than hard greases. By my invention, however, the penetration curve of a semi-fluid grease for a given soap content also drops sharply from the transition temperature to the critical temperature and rises sharply as cooling and agitation are continued beyond the critical temperature, as will further appear.

It will be seen from the foregoing that the "critical temperature" is the lowest temperature, below the transition or gelation temperature, at which a stable grease of maximum hardness can be obtained with a given amount of soap, while cooling with agitation, and below which hardness decreases and instability ensues.

This critical temperature, while readily ascertainable for any grease, will vary. No general absolute value can be given. For example, it varies with the field from which the oil stock is obtained; with the particular refining treatment given, as, for example, it will vary depending upon whether or not the oil is distilled; with the cut taken; with the particular blend, in the case of blending; with the soap used; with the composition, and the like, as will appear during the discussion of the graphs or curves illustrated in the drawings. Merely by way of partial illustration, aluminum soap greases are usually heated to about 300° F. and they are cooled to nearly the transition or gelation temperature, usually ranging from substantially 90° F. to 230° F. The critical temperature, however, will be from substantially 20° to substantially 50° below the transition temperature of the particular grease. In the case of low viscosity lithium greases, they are usually heated from about 400° F. to about 450° F. and the transition or gelation temperature is usually from about 200° F. to about 300° F. The critical temperature will usually be from about 20° to about 30° lower than the transition temperature of the particular grease. The critical temperatures for calcium and sodium greases are likewise substantially below the transition temperatures. Further illustrations of the reasons why the critical temperature varies will appear later.

The preferred way of practicing the invention and of realizing its advantages to the fullest extent, is illustrated in the accompanying drawings, wherein—

Figure 1 is a diagrammatic illustration of one form of apparatus suitable for making grease and for carrying out the invention;

Figure 2 is a diagrammatic illustration of another form of suitable apparatus;

Figure 3 is a longitudinal section of one form of unit which may be employed in both the heating and in the cooling stages of the process;

Figure 4 is a transverse section taken on the line 4—4 of Figure 3;

Figure 5 is a longitudinal section through one form of unit which may be used in the final working stage, where working after gelation is required;

Figure 6 is a section taken on the line 6—6 of Figure 5.

Figure 7 is a diagrammatic layout of a pilot plant which may be effectively used to determine the critical point for any given grease and to determine the optimum results which can be obtained under any given set of conditions;

Figure 10:
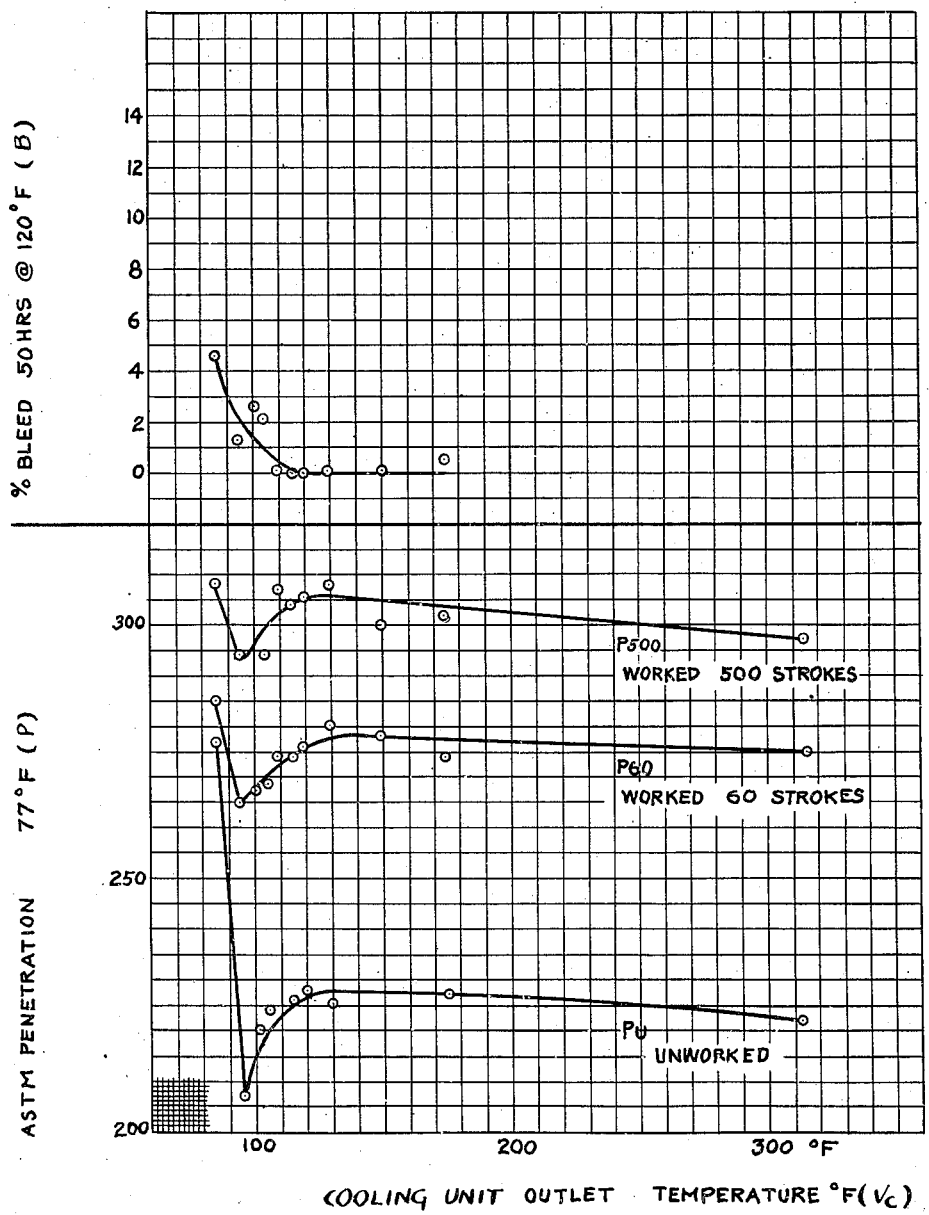

Figures 8 to 17 inclusive are graphs or curves illustrating how the critical temperature varies with the starting materials and other variables; and Figures 18 to 25 inclusive illustrate how the critical temperature is affected by other factors such as through-put, power input, etc.

Referring now to Figure 1, predetermined relative proportions of a pre-manufactured soap and mineral oil are placed in a tank 10 and subjected to a relatively thorough mixing in any suitable manner, as, for instance, by means of an agitator 11, driven by a motor 12. As a result of this pre-mixing, there is formed a slurry with the soap in suspension in the oil. The slurry is ordinarily formed at room temperature and may be withdrawn from the tank 10 through a discharge line 13 having a control valve 14. In order that the slurry may be continuously delivered to the line 13, there would ordinarily be provided a plurality of the tanks 10, with separate valved connections so that while a slurry is being made in one tank, the prepared slurry may be withdrawn from another.

In case a relatively light grease is to be made, such as the lighter forms of lithium stearate grease, the mixture of soap and light-bodied oil will not pick up any appreciable quantity of air during agitation in the tank, but if a relatively heavy-bodied grease, such as aluminum stearate grease or heavy lithium stearate grease, is being made, it may be found that undesirably large quantities of air may become entrained in the oil-soap slurry in the tank. If deaeration is not necessary, the slurry is delivered from the line 13 through a valve 15 and line 16, and is forced by a pump 17 into and through the heating unit 18.

In case a heavy-bodied grease is being made, and air has been incorporated in the slurry during the mixing in the tank 10, the valve 15 is closed and the slurry from the line 13 is delivered through a line 19 having a valve 20, and discharged into a deaerator chamber 21 which is connected by a line 22 and valve 23 to the line 16. The deaerating chamber may be of any suitable form and is closed, so that a vacuum may be maintained therein by any suitable form of vacuum pump connected through a line 25 having a control valve 24.

A suitable heating unit 18 is shown in some detail in Figures 3 and 4. This unit includes a chamber 26 formed as a thin annular confined space between the peripheral wall 27 of a cylindrical vessel and a comparatively large core or shaft 28 mounted therein. The core is provided with scrapers 29 which engage the wall 27 and it is preferably operated at relatively high speed, in a suitable manner, as, for instance, by an electric motor driven on a shaft extension 30. As will further appear, the speed will vary, in commercial operation, from about 100 to about 600 R. P. M. depending upon the grease being manufactured and the size of the heating unit. Surrounding and spaced from the wall 27 is a jacket 31 providing an annular space for the heating fluid which may be delivered through a valve controlled inlet 32 at one end and discharged through an outlet 33 at the other end. The pump 17 delivers to an inlet 34 at one end of the heating unit, and the heated and mixed material is discharged through an outlet 35 at the opposite end. The jacket for the temperature changing medium is preferably encircled by a layer of insulation 36. The oil-soap slurry is forced continuously and under pressure through the heating unit 18 by the action of the pump, and, in the heating unit, the slurry is heated to such temperature as may be required to effect solution of the soap in the oil, which will vary with the particular grease being made for reasons hereinbefore and hereinafter indicated. The heater, which is also a thorough and violent agitator, effects a uniform dispersion of the soap in the oil, and as the temperature changing medium causes the soap to go into solution, there is effected a uniform solution and dispersion of the soap while maintaining the slurry under a pressure sufficiently high to prevent vaporization of the oil (such as light ends), or any of the moisture that may be present. The supply of heating medium is controlled by the valved inlet 32 so that the temperature to which the slurry and the resulting solution is heated may be varied, in accordance with the particular requirements of the soap and the oil employed. Steam may be used as the heat exchange medium in those cases where it is not necessary or desirable to heat the slurry to a temperature above 300° F. If it is required to heat the slurry to a higher temperature, such as, for example, 400° F. and above, it is desirable to employ a heating medium having a very much higher boiling point than water at atmospheric or higher pressure. A suitable heating medium which may be employed where higher temperatures are required comprises a high boiling point liquid such as a mixture of diphenyl and diphenyl oxide.

Various other heating units may be employed in which thorough agitation and effective heating of the character described may be simultaneously produced. It is desirable that the heating unit be part of a closed system which may be maintained under pressure, so that the oil can not vaporize, and it is likewise desirable that the chamber of the heating unit be of such construction as will maintain the material in a comparatively thin, confined layer, so that there will be only a relatively small amount of material undergoing heating and agitation whereby the material may remain in the chamber for only a matter of seconds. The residence time in the heater will, of course, vary with the particular grease being made. Thus far I have found that a residence time, with the scraper type of heater described, of from a comparatively few seconds to about 120 seconds is adequate for most purposes.

It is also desirable that the heater-agitator have a scraper or scrapers which will remove any films from the heat transfer wall 27, rapidly and substantially continuously, whereby to facilitate the rapid heat transfer and prevent scorching and other damaging reactions to any of the ingredients.

The hot solution of the soap in the oil may now be passed directly from the outlet 35 to a cooling unit 38, depending upon the kind of grease being made. Usually pre-manufactured soap, such as lithium stearate, aluminum stearate and calcium stearate, may be obtained commercially in substantially anhydrous form so that elimination of moisture from the oil-soap mixture is unnecessary. When such soaps are used, the hot grease may pass directly from the outlet 35 through an open valve 39 into the line 40 leading to the cooling unit. In some cases the soap bases as secured from the supplier, or, as manufactured by the grease manufacturer, may contain undesirable amounts of moisture or the soap bases may be such as are inherently hydrous. Where such soap bases are employed, it is desirable to effect moisture control or elimination immediately following the heating stage and prior to the cooling.

This moisture control or elimination may be accomplished in the system illustrated in Figure 1, by closing the valve 39 and opening a valve 41 in the line 42 leading to a flash tank 43. The flash tank is a closed one and has a delivery line 44 controlled by a valve 45 leading to a pump 46 discharging the mixture into the inlet 40 of the cooling unit. The flash tank is provided with means whereby it may be maintained at atmospheric pressure or at any desired pressure below that maintained in the heating unit or below that of the atmosphere, and preferably has a baffle between the inlet and the outlet.

As shown, the flash tank has an outlet pipe 47 provided with a three-way valve 48, with one branch 49 leading to the atmosphere and another branch 50 leading to any suitable means for producing a vacuum. By turning the valve 48 to connect the flash tank to the atmosphere, the presure in the flash tank will drop to that of the atmosphere, and by reason of the higher temperature of the soap-oil mixture, the moisture will flash to steam and escape. If it is desired to insure a complete removal of all moisture, then it may be desirable to turn the valve 48 so as to maintain a vacuum in the flash tank. If it is desired to retain a small amount of moisture in the soap, or if the temperature of the material in the flash tank is such that there may be vaporization of the oil, the valve may be turned to a point where it will throttle the outlet 47 and maintain a pressure in the flash tank above that of the atmosphere but below that of the vapor pressure of the material in the heating unit.

The valve 41 may serve as a throttle valve so that the pressure ahead of the valve may be 300 to 400 lbs. and beyond the valve, 25 to 50 lbs., so that all moisture will flash off in the tank 43, even without dropping the pressure to atmospheric, and thus in some cases the pump 46 may be omitted.

Referring now to the cooling unit 38, this is a unit designed to cool the hot grease at a very rapid rate. In this connection, although the transition temperature and the gelation temperature are for all practical purposes identical, there is a time lag following the achieving of that temperature before actual gelation substantially begins to take place. By providing a cooler with a sufficiently rapid rate of heat transfer, I am enabled to take advantage of this time lag and to cool down through and from the transition temperature and to the critical temperature without running into difficulties as hereinbefore described, while at the same time the maximum achievable results for a given quantity of soap are obtained. The cooling unit 38 is preferably of the same construction and operation as the heater unit hereinbefore described and illustrated in Figures 3 and 4.

In the cooling unit, the temperature of the grease is reduced to and through the transition temperature and to a point which is substantially below that at which the soap is soluble in the oil, that is to say, to the critical temperature or at least near to it. In some cases, as, for instance, in the case of semi-fluid greases, it may be desirable to cool not only to the critical temperature but beyond it, while agitating. The extremely rapid rate of cooling obtained in the cooler of Figures 3 and 4 is brought about by reason of the fact that the hot grease is passed through the cooler in a thin, confined layer, so that only a relatively small quantity of material is in residence therein at any time and by reason of the fact that the films on the heat transfer wall, substantially as they are formed, are continuously removed from the heat transfer wall and are continuously and rapidly mixed with the remainder of the mixture in the cooler, due to the rapidly rotating scrapers which, as in the case of the heater, rotate at a speed of from about 100 to about 600 R. P. M. depending upon the particular grease being made and the size of the cooling unit. Thus fresh material, as it were, is continuously being brought into contact with the heat transfer wall and the temperature of the mass within the cooler is rapidly and substantially uniformly lowered to the desired temperature, with no substantial portion of the mass being cooled below the temperature ultimately achieved by the mass as a whole. Specific rates of cooling obtained will be hereinafter given.

The heat exchange or cooling medium may be supplied to the jacket of the cooling unit through a valve controlled inlet 51 and discharged through an outlet 52. The medium may be brine or cold water, or the like, depending upon the amount of heat to be withdrawn, the time during which the heat withdrawal is accomplished, and the rapidity of flow of the cooling medium through the jacket.

Various other cooling units may be employed, providing they have a rate of heat transfer at least substantially equivalent to that obtained in the cooling unit described and shown in Figures 3 and 4. In other words, what is required of the cooling unit is that it shall have a rate of cooling sufficiently rapid to enable one to take advantage of the very, very short time lag between the achievement of the transition temperature and the beginning of substantial gelation which occurs at that temperature, during which time lag the temperature may be safely lowered to the critical temperature without running into difficulties and with the attainment of the maximum achievable effect from a given quantity of soap.

If the operation of the cooling unit 38 be properly controlled, the grease will issue therefrom through the line 53 at the desired temperature and the final grease will be a very stable product with no visible syneresis. In the case of hard grease, this temperature will be preferably near and more desirably at the critical temperature. With greases which require appreciable time for gelation, it is desirable to lead the grease as discharged from the cooler to a gelation vessel 98 of larger cross sectional size so as to provide a sufficiently long time lag between the delivery of the grease thereto and the discharge of the grease therefrom, to permit the grease to completely gel quietly, i. e., without substantial agitation. For those greases that are sensitive to temperature change during gelation (i. e., sensitive to thermal shock), the gelling in the gelation vessel should be done substantially isothermally, i. e., there should be no substantial drop in temperature in the gelation vessel. The final product will be as described. In some cases, depending upon the particular grease being manufactured, the grease may be discharged directly from the gelation vessel to the package. In other cases, it may be desirable to further work the grease after gelation, with or without further cooling, as will later appear.

In the case of still other greases, as, for example, semi-fluid greases, particularly those made from an oil producing a grease which is relatively insensitive to thermal shock and relatively non-bleeding, it is frequently desirable, as will appear from certain of the graphs, to cool, while agitating, appreciably below the critical point, the cooling and agitation being continued until the grease achieves the desired softness while still retaining stability, whereupon the grease may be discharged directly to the packaging apparatus through the line 54, controlled by the valve 55, or to pans.

In the case of greases to which it is desirable to give a relatively slow working to provide a softer grease of stable consistency, the additional working may be accomplished by closing the valve 55 and opening a valve 56 leading to a working unit 57 in which the grease is relatively slowly worked while passing in relatively large volume through a chamber maintained under controlled pressure. The worked grease leaving the working unit may pass through a line 58 leading to the packaging apparatus and controlled by a valve 59.

Ordinarily the grease passing through the working unit 57 will be merely held at a substantially constant temperature, approximating that at which it is delivered from the cooling unit 38. In the case of some greases, however, it may be desirable to simultaneously effect a further reduction in temperature as the grease passes through the working unit, this being accomplished by cooling the working unit 57 in conventional manner.

Various different forms of working units may be employed and that illustrated in Figures 5 and 6 is merely one example. In the form illustrated, there is provided a cylindrical chamber 60 surrounded by a jacket 61 through which cooling medium may be delivered through an inlet 62 and from which it may be discharged through an outlet 63. Within the cooling jacket there may be a helical baffle 64 to prevent direct by-passing of the cooling medium from the inlet to the outlet. Within the chamber is a shaft 65 having pins, blades or other working elements 66, preferably extending substantially radially and arranged helically. The peripheral wall of the chamber carries a series of pins, blades or other baffle elements 67, so positioned that they extend inward radially substantially to the shaft 65 and arranged alternately with elements 66 on the shaft. The material may be continuously delivered to the chamber through an inlet 68 at one end and continuously discharged through an outlet 69 at the other end.

In the process as thus far described, there is provided a tank 10 for mixing a pre-manufactured soap and oil. In many cases the grease manufacturer desires to manufacture his own soap or to make the soap simultaneously with and as a part of the process of making the grease. In Figure 2 there is illustrated a modified form of apparatus in which the soap may be manufactured as part of the complete grease making process. Separate tanks 70, 71 and 72 are provided for the caustic, the fats or fatty acids, and the mineral oil. These tanks have outlets 73, 74 and 75, respectively, and such outlets are controlled by valves 76, 77, 78, and leading to pumps 79, 80 and 81. These pumps discharge to a line 82 having a valve 83 between the connections to the pumps 80 and 81. This line discharges to the inlet of the heating unit 18 and between said unit and the connection to the pump 81 there is provided a valve 84. When it is desired to make the soap separately, the valve 83 is closed and caustic is fed from the tank 70 through the valve 76 and metering pump 79 to a line 85, while fats or fatty acids are fed from the tank 71 through a valve 77 and metering pump 80 to said line 85. The mixture is passed through a heating unit 86 similar to the heating unit 18 above described, and which may be heated either with steam or a high boiling point liquid such as a mixture of diphenyl and diphenyl oxide, depending upon the temperature required for the particular grease. The reaction involved in making the soap from the caustic and fatty acids results in the production of moisture, and it is desirable that at least the greater part of such moisture be removed before the soap is mixed with the mineral oil. For this purpose the soap may be discharged from the heating unit 86 through a line 87 to a flash tank 88, which may be similar to the flash tank 42 and have connections 89 and 90 to the atmosphere and to a vacuum, respectively.

The deaerated and partially dried molten soap is discharged from the flash tank 88 through a valve 91, and by means of a pump 92 to a line 93 leading to the inlet of the heating unit 18. This line has a valve 94 so that when the soap is being made as above described, the valves 84 and 94 may be opened and the mineral oil and the soap delivered to the heating unit 18. From the heating unit 18 the grease is delivered to a cooling unit, such as that described in connection with the discussion of Figure 1.

In some cases it is desirable to carry out the saponification simultaneously with the manufacture of the grease and in the same unit. This may be done by using the heating unit 86 as the main heating unit and cutting out the heating unit 18. By opening the valves 83 and closing the valves 84 and 94, the caustic, fats or fatty acids, and the mineral oil, may be delivered through the line 85 to the heating unit 86 and through the flash tank 88. By opening a valve 95 in the line 96, the pump 92 may deliver the hot liquid grease to a cooling unit similar to the unit 38 of Figure 1.

In some cases it may be found difficult to get complete saponification of the caustic and fat or fatty acids if all of the oil is added to the other ingredients delivered to the heating unit 86. In that event, the valve 95 is closed, the valve 94 is opened, and a valve 97 leading from the heating unit is also opened, while valves 83 and 84 are regulated so that a predetermined portion of the mineral oil passes to the line 85 and through the unit 86, while the remainder of the mineral oil passes directly from the valve 84 to the inlet of the heating unit 18. Thus a partially formed grease is prepared in the unit 86, and this partially formed grease is then delivered through the flash tank 88 and line 93 to the inlet of the heating unit 18, where the partially formed grease is mixed with the oil entering through valve 84. The mixture is further heated and agitated in the heating unit 18, hereinbefore described in connection with Figure 1. In some cases the flash tank 88 may be by-passed if the quantities and characteristics of the initial soap-forming ingredients are closely controlled, so that no excess moisture is formed in the saponification step, and the moisture is finally removed at the flash tank 43.

Reverting to greases such, for example, as lithium base greases made from light viscosity oils and some aluminum base greases, which require a time lag for gelation, as hereinbefore mentioned, this time lag or gelation period may be provided by the said elongated chamber 98 hereinbefore referred to. This chamber has its opposite ends connected by pipes 99 and 100 to the pipe 53 on opposite sides of the valve 56 and has valves 101 and 102, so that by closing valve 56 and opening valves 101 and 102, the grease may be diverted through the chamber 98 and flow slowly through the latter. For example, with one form of lithium base grease, the cooler 38 will rapidly cool the grease down to the critical point (e. g., 210° F. or thereabout) while the agitator in the cooler is rotating at the proper speed. The chamber 98 may be of such capacity that the grease flows slowly therethrough and is in the chamber from 10 to 30 minutes as against the range of relatively few seconds in the cooler of the kind hereinbefore referred to. The chamber may be insulated so that the temperature drop in the chamber is small or the chamber may be jacketed for the flow of a heat control medium therethrough for the purpose of maintaining the temperature of the mass within the chamber constant during the gelation, depending upon how sensitive the particular grease is to thermal shock. It is, of course, to be understood that different greases require different gelling times, as this will vary with the source of the oil, the refining treatment, the soap, the composition, and the like, as hereinbefore indicated.

The agitator in the working unit 57 may be rotated at only 100 to 300 R. P. M. and the cooling there may be to about 90° to about 150° F., by way of illustration, the extent or amount of cooling, while working, being again dependent upon the particular grease being manufactured.

Instead of using the agitator shown in Figures 5 and 6, I may use one which has both a scraper blade, as shown in Figures 3 and 4, and a non-scraping blade provided with a small clearance (1/64") to cause a breaking down of the gel structure, and the production of a softer and smoother product of stable consistency. Other forms of working may be employed. For instance, the grease may be pumped, or pumped through screens, or passed through mills or other apparatus.

In the foregoing I have referred to a thin confined layer. The word "thin" is to be interpreted as relative to the diameter of the chamber and the circumference of the heat transfer surface. Ordinarily the thickness of the layer to be agitated should not be over about 10% of the diameter of the heat transfer wall. For instance, a 10 inch diameter chamber might have an 8½" shaft or core, leaving an annular space for a ¾" layer. Thus there is provided a large surface to volume ratio.

Reverting to the flash chamber, the pressure drop in such chamber may be controlled by a float acting on a steam and air outlet valve so that the valve may open, close, or remain in such position that the pressure in the flash chamber will be only such as will force the grease through the other units of the apparatus. With the valve closed, pressure will build up, the outflow will be speeded up, the level in the flash chamber will drop, and the valve will reopen.

Although the cooling and agitating is disclosed as in a thin film, and by a scraping agitator, the cooling and agitation may in some cases be effected by throwing the material in continuous streams or droplets by centrifugal force over or against a cooling surface, providing the rate of cooling is sufficiently rapid to permit of cooling, while agitating, quite substantially below the transition temperature and preferably near to and in some cases more desirably at or below the critical temperature, as hereinbefore described.

The slurry of soap and oil may in some cases be formed of a dry, finely divided caustic in suspension in the fat or fatty acid.

It will be seen from what has been said that the essential feature to which my invention is directed is the cooling of the hot grease to near to, or at, or below, the critical temperature. 1 prefer to accomplish such cooling in the system disclosed in Figure 1 or 2, for the reason that the type of heating herein employed, lends itself most effectively to combination with such cooling to secure optimum results, such as high yield (soap-oil ratio for a given hardness), a superior product not only from the standpoint of color but also from the standpoint of uniform consistency, short residence time, small amount of material in residence in the system at any time under heat, with consequent great reduction in fire hazard, and other advantages pointed out in the aforesaid copending application.

However, since the essential feature of this particular invention is the aforesaid cooling to near to, to or below the critical temperature, it is obvious that the invention is not limited to the specific procedure which is employed for obtaining the hot grease. I have found that starting with the hot grease, no matter how prepared, or even when using scrap grease, I can improve on the quality and, at least in substantial part, secure the advantages described, by cooling such grease in accordance with my invention.

I have heretofore given some indications as to why the critical temperature is not absolute, generally considered, but varies with each particular grease. The following is an amplification thereof.

The lubricating oils used in grease manufacture may be from any source, such as Pennsylvania (paraffinic), Coastal (naphthenic), foreign (aromatic) or Mid-Continent (a mixture of paraffinic and naphthenic). Furthermore, oil stocks for grease making vary with refinery treatment, from a minimum to a maximum of refinery treatment. Oils up to 2,000 SSU at 100° F. oil are usually distilled stocks and are therefore quite highly refined. However, viscosity alone is not of sufficiently distinguishing difference, since an 800 SSU at 100° F. may be a blend of a distilled 200 SSU at 100° F. stock and poorly refined heavy oil. A "Bright Stock" is a heavy oil (about 150 SSU at 210° F.) which has been vacuum distilled. A "Cylinder Stock" is a poorer refined heavy oil and may have a sulfuric acid wash or be steam distilled. In general, distilling, solvent treating, and dewaxing lead to a more refined stock over the original starting stock in the refinery. Obviously the cut or distilling range, which leads to light and heavy stocks, automatically includes a wide range of molecular weights and isomers; light oils having an average molecular weight of say 350, and heavy oils of say 600.

The viscosity range for oils used in aluminum grease is generally 50 SSU at 210° F. and up, although a number of such greases are made with 200 SSU at 100° F. oil and a few with 60 SSU at 100° F. oil.

Calcium grease is usually made from oils having a viscosity range of from 100 to 1000 SSU at 100° F.

Sodium greases are generally made from heavy oils.

Lithium aviation grease is generally made from 50 SSU 100° F. oil, while general service lithium greases are made from heavy grades of oil.

Aluminum stearate soap is generally made from aluminum sulfate by double decomposition with soda soap. Commercial stearate is a widely varying mixture of stearic acid and palmitic acid, if made from tallow; if made from hardened fish oil, it will contain saturated fatty acids up to $C_{22}$; if from hardened cottonseed oil, it will contain a higher percent of stearic acid. These soaps are generally made by a soap manufacturer and sold as dry (1% or less moisture) powder of about 200 mesh. Obviously aluminum can combine as the mono-, di- or tri-stearate. The distearate is the one generally used. Though various soap manufacturers generally use double decomposition as the method of making aluminum soap, the impurities left in the soap, the type of fatty constituents, and the type of mono-, di- and tri-mixtures, all lead to variations which have a marked effect, particularly as to yield and stability.

Calcium soap is generally made by the grease manufacturer in pressure vessels. Lard, cottonseed, tallow and other fats are used. These fats are not hydrogenated and consequently contain the unsaturated acid, oleic. This is in contrast to the aluminum and lithium soaps which contain little oleic acid as measured by iodine value. The calcium grease made from these materials differs from other greases in that moisture is generally necessary for stability. About 1 to 1.5% moisture is employed below or above which the grease becomes unstable. Moreover, calcium grease is generally considered as an emulsion rather than a true gel. In certain cases, an anhydrous calcium stearate grease can be made and in this case a gel is formed.

Sodium soap grease is generally made from tallow or fat stocks which are harder than those used in the manufacture of calcium greases. In addition, the finished grease is substantially anhydrous and is a gel.

Because of considerations such as the foregoing, neither the transition or gelling temperature nor the critical temperature, although readily determinable, is absolute in a broad sense, but will vary as the conditions vary.

The following illustrates one manner of arriving at the critical temperature for any particular grease and, incidentally, demonstrates that the critical temperature is not absolute. This critical temperature, as before indicated, is the lowest temperature, below the transition temperature, at which a particular grease can be made in stable form. It is the method followed in arriving at graphs, Figures 8 to 17 inclusive.

A grease-making "cooling" curve is made. To arrive at this curve, a pilot plant set-up, such as shown in Figure 7, is employed. The heater and the cooler are of the type hereinbefore described. Each has an internal diameter of 3", is 12" long, and is capable of operation at speeds of from about 150 to 700 R. P. M. The thin confined layer is 3/8" thick.

In the graphs of Figures 8 to 17 inclusive, the heater and the cooler were run at 500 R. P. M. and the throughput was 37½ lbs. per hour.

The outlet temperature, $V_c$, of the cooler is lowered in approximately 10° F. intervals, (although smaller intervals are desirable at around $T_c$—the critical temperature) from the temperature of the heater, $V_H$, which is of the type hereinbefore described, down to room temperature or below. Equilibrium is allowed to establish at each point. Samples are then taken at each interval drop in temperature.

Grease samples were taken in beakers and allowed to cool in air to 77° F. for penetration (hardness) tests in order to measure the consistency of the grease when cooled. This air cooling of the samples in beakers is usually satisfactory where the grease is relatively insensitive to thermal shock during gelation. If, however, the grease is one which is sensitive to thermal shock the gelation, for optimum accuracy of results, should occur under isothermal conditions by maintaining temperature substantially constant during gelation by well understood means, such as the use of ovens set at each outlet temperature, so that the gelling can be carried out under ideal thermal conditions. For the purpose of the following curves, however, the procedure was identical, i. e., the samples were each taken in beakers as described and cooled to 77° F. and tested, so that the conditions under which gelling took place would be the same in each case.

The penetration tests were the standard ASTM penetration tests. First a penetration, $P_u$ ($u$ for unworked) was run on the grease sample, Then in order to determine the breakdown of the grease, a sample was placed in an ASTM worker, worked sixty (60) strokes and a new penetration, $P_{60}$, obtained. Then the grease was replaced in the worker, and worked for an additional four hundred forty (440) strokes making a total of five hundred (500) strokes and a $P_{500}$ obtained.

In addition to the penetration tests, oven bleed tests were made to determine how sensitive the grease is to bleeding and to determine the relationship of bleed to initial temperature. This was done by weighing out ten (10) grams of the air-cooled grease beaker samples into a perforated cone supported by a 50 cc. beaker. The amount of oil which separates and falls to the bottom of the beaker is a measure of the bleed. In the case of aluminum grease, for example, the grease was maintained for fifty (50) hours at 120° F. and the amount of bleed measured. In the case of lithium grease, for example, the grease was maintained for fifty (50) hours at 210° F., and the bleed measured. The differential loss of the grease sample, combined with bleed, gives the evaporation loss.

(The other tests for proper gelling are generally visual in character and involve an experience factor. These consist of (a) surface sheen, (b) brightness, (c) transparency and (d) float. The first three of these are self-explanatory. "Float," however, is defined as the roughness appearance of a thin-spread film of grease when it is examined in reflected light. Float cannot be felt and apparently has little to do with the serviceability of the grease but has considerable to do with the sales appeal of the product. Improper gelling is the main cause of float and probably results in different grease structures of different hardness, which are then worked together but not completely incorporated in the main part of the grease. Impurities in the original soap may also contribute to float. These tests are here referred to only because the greases of the graphs satisfactorily passed the same.)

DISCUSSION OF GRAPHS OR CURVES

Figure 8 illustrates the results obtained by testing aluminum soap grease from heavy Mid-Continent oil in the manner just above set forth in the discussion of the pilot plant operation.

The data as to oil and soap analysis, etc. follows:

*Figure 8*

Aluminum grease:
  Critical temperature (Tc) for heavy oils. Penetration (P) and bleed (B) curves of cooling unit (Vc) samples. Both curves agree on Tc.
  Formula:
    Percent heavy Mid-Continent oil _____ 94
    Percent aluminum stearate _____ 6
  Oil analysis:
    Viscosity _____ [1] 126
    Viscosity index (VI) _____ 63
    API gravity _____ 23.7
    Avg. mol. weight _____ 550
  Soap analysis:
    Percent moisture ($H_2O$) _____ 0.6
    Percent total fatty acid (TFA) _____ 89.2
    Percent free fatty acid (FFA) _____ 8.2
    Percent ignition residue (IgR) _____ 9.4
    Percent water soluble residue (WSR) _____ 0.8
    Percent water insoluble residue (IR) _____ 8.6
    Titer °C _____ 52
    Iodine value (IV) _____ 5
    Saponification value (SV) _____ 192
  Tc=140±5° F. (Accuracy can be improved with more points around Tc).
  Gel point (transition), approx. 175° F.

[1] SSU at 210° F.

It will be seen from the curves in the upper half of the figure that the cooling curve drops very sharply from the gelation temperature, which is approximately at 175° F. down to the critical temperature, which is approximately 140° F. It will be seen that the maximum hardness is obtained at the critical point and that as cooling, with agitation, continues below the critical point, the curves rise sharply, showing that this particular grease quickly softens.

The bleed curve at the bottom of Figure 8 shows that the critical temperature for bleeding coincides with the critical temperature for maximum hardness for the soap content employed.

It is apparent, therefore, that this grease should desirably not be cooled below the critical temperature.

Again, referring to the upper half of the figure, it will be seen that the penetration or hardness for the $P_{60}$ working and the $P_{500}$ working are very close together, which illustrates the fact that this grease, when cooled to or near the critical temperature, will stand up excellently under service conditions. It is noted that the spread between the penetration or hardness of the grease in the unworked condition and in the $P_{60}$ worked condition is greater. This type of grease, therefore, is one which should be worked, following cooling to the critical temperature, for by such working the spread in the penetration as between the unworked condition and the $P_{60}$ and the $P_{500}$ worked condition will be brought much smaller. Even if this grease be unworked, following the cooling, it will be superior to the grease obtained when employing the customary cooling, for the spread in hardness between the unworked and the $P_{60}$ worked condition is only about 35 points, as against the difference of 70 to 100 points ordinarily found between the unworked and worked penetration, with cooling only to the transition or gelation temperature as is customary. In passing, it might be commented that the $P_{500}$ working is a very extensive working, notwithstanding which there is but a small change in penetration as between the $P_{60}$ and $P_{500}$ working when the grease is made by the process of my invention.

It will be obvious from the curves of Figure 8 that the nearer the critical temperature is reached, the greater the hardness for a given quantity of soap and, therefore, the greater the "yield."

Figure 9 shows the penetration and bleed results obtained when proceeding as above described, and employing a Pennsylvania Bright Stock (a highly refined heavy oil) and 10% aluminum stearate for the grease. It will be seen that the transition or gelation temperature is approximately 225° F. and the critical temperature approximately 190° F., 35° lower. The penetration curves show the same general characteristics as those of Figure 8. This particular grease is also improved on further working. Note that the grease is relatively insensitive to thermal shock on gelation, the bleed curve being straight as shown. Hence, this grease may be cooled, while agitating, to below the critical point a substantial amount, to secure softness without bleeding, i. e., without detrimental effect on the gel structure. The data for the grease of Figure 9 follows:

Figure 9

P-Vc curve shows Tc grease not sensitive to thermal shock; therefore bleed zero.

Formula:
| | |
|---|---:|
| Per cent Pennsylvania Bright Stock | 90 |
| Per cent Aluminum stearate | 10 |

Oil analysis:
| | |
|---|---:|
| Vis | [1] 193 |
| VI | 107 |
| API grav | 26.3 |
| Avg. mol. wgt | 570 |

Soap analysis:
| | |
|---|---:|
| Per cent H$_2$O | [2] 2.0 |
| Per cent TFA | 89.3 |
| Per cent FFA | 6.5 |
| Per cent IgR | 11.6 |
| Per cent WSR | 1.3 |
| Per cent IR | 10.3 |
| Titer, °C | 51.2 |
| IV | 3.5 |
| SV | 200 |

Tc=190±5° F.
Gel point=approx. 225° F.

[1] SSU at 210° F.
[2] 2 per cent moisture leads to poor yields; i. e. soft grease.

Figure 10 shows the results obtained in determining the critical temperature of a grease made from low molecular weight, low viscosity (75 SSU at 100° F.) oil, the grease being sensitive to thermal shock. The transition temperature is approximately 120° F. and the critical temperature approximately 95°.

Note that this grease apparently begins to bleed before the critical temperature is reached. As above stated, all samples of these curves were air cooled in beakers to 77° F., this being done so that all samples would have been treated alike. Since the particular grease is very sensitive to thermal shock, gelation should have been accomplished isothermally as hereinbefore pointed out, as being requisite for a grease made from this type of oil. Had the samples been isothermally gelled, the beginning of bleeding would have coincided with the critical temperature, thus making it possible to cool this particular grease down to the critical temperature without encountering bleed. However, substantially below critical temperature, bleeding would occur when cooling with agitation. Hence, this particular grease should desirably not be gelled below the critical temperature.

The data as to the grease of Figure 10 follows:

Figure 10

Tc for light oils. P-Vc and B-Vc curve. Grease sensitive to thermal shock. B-Vc curve shows break at higher temperature than P-Vc. (Beaker samples.)[1]

Formula:
| | |
|---|---:|
| Percent light paraffinic stock [2] | 92 |
| Percent soap | 8 |

Oil analysis:
| | |
|---|---:|
| Vis | [3] 75 |
| VI | 193 |
| API grav | 26.9 |
| Avg. mol. wgt | 286 |

Soap analysis:
| | |
|---|---:|
| Percent H$_2$O | 1.0 |
| Percent TFA | 93.9 |
| Percent FFA | 5.1 |
| Percent IgR | 9.6 |
| Percent WSR | 0.7 |
| Percent IR | 8.8 |
| Titer, °C | 52 |
| IV | 5.3 |
| SV | 200.0 |

Tc=95±5° F.
Gel point, approx. 120° F.

[1] Thermos samples would probably cause break in both penetration and bleed curves to coincide at one Tc.
[2] Distilled, acid treated, reduced, dewaxed stock.
[3] At 100° F.

In connection with Figures 8, 9 and 10, it will be noted that the critical temperatures for these particular greases differ substantially from one another, confirming what has been heretofore said to the effect that there is a critical temperature for each grease.

In passing, it might also be mentioned that the depth of the vortex, i. e., that portion of the curve from the transition temperature to the critical temperature and below the latter, gives an accurate indication of the sensitivity of the particular grease to thermal shock, thus affording a guide to the procedure to be followed in any given case.

Figures 8, 9 and 10 also show that the lower molecular weight fractions, i. e., the low viscosity oils cause lower critical temperatures than the heavy oils.

Figure 11:
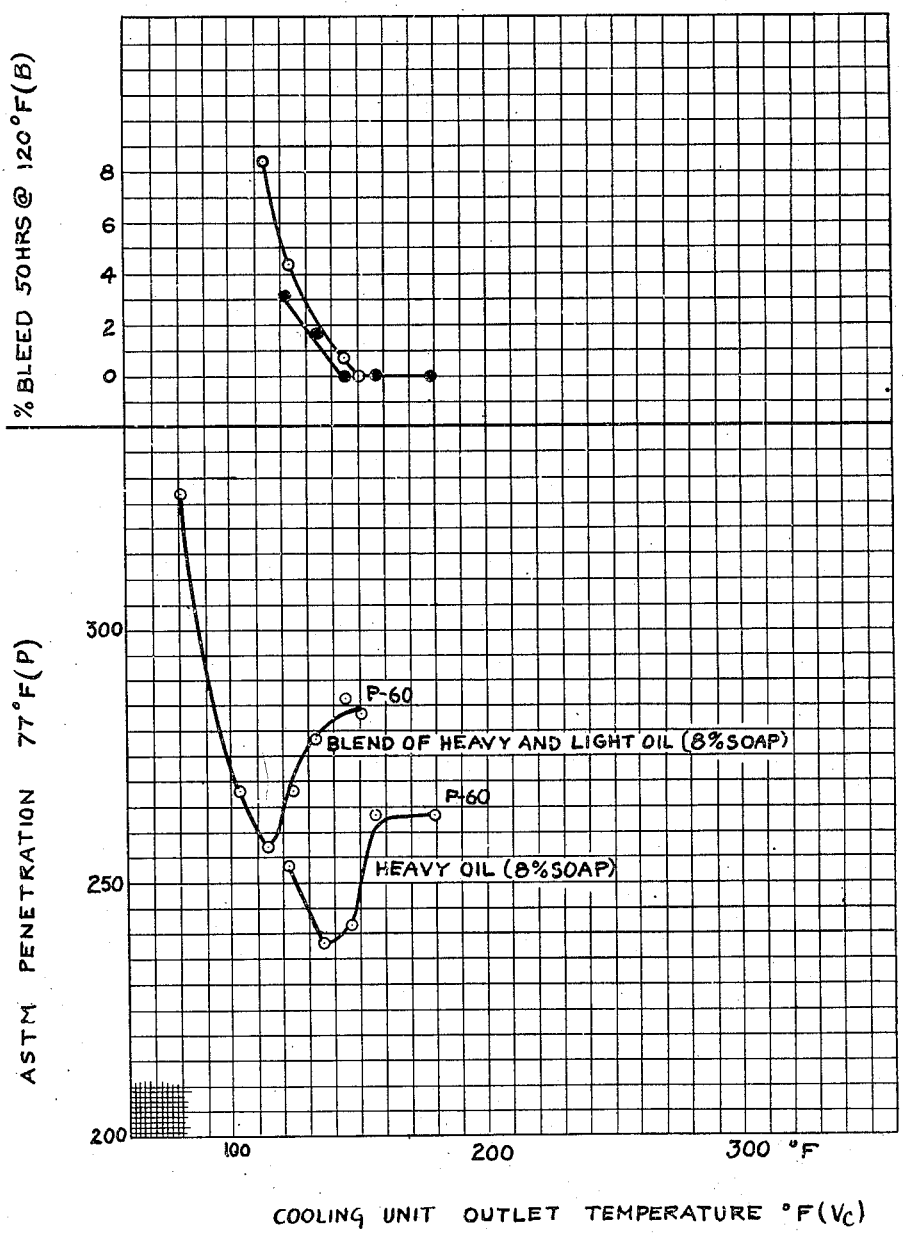

Figure 11 shows the effects when using light viscosity oils. In this case, a comparison is made between a heavy oil and the same heavy oil blended with a light viscosity oil. It will be seen that the blending of the oils caused the critical temperature to drop from approximately 140° F. to approximately 115° F. and also that the yield was decreased. The curve also serves the additional purpose of establishing that it is better to choose a particular cut or range of cut giving the desired viscosity, rather than to attempt the makeshift of blending light and heavy oils to secure the desired viscosity if maximum yield is desired.

Here, again, in Figure 11, the bleed curve for the blended oil grease shows bleeding before the critical temperature is reached, which is accounted for for the reasons set forth in the discussion of Figure 10. Had the beaker sample been Thermos cooled, the bleeding curve for the blended oil grease would have moved to the left, and had the beaker sample been isothermally gelled that curve would have moved still farther to the left so as to substantially coincide with the critical temperature.

The data as to the grease of Figure 11 follows:

Figure 11

Tc for blends of oils. P$_{t0}$-Vc and B-Vc curves for heavy oil and a 50-50 blend with light oil.

| | Heavy | Blend |
|---|---:|---:|
| Formula: | | |
| Percent Heavy Coastal Bright Stock | 92 | 46 |
| Percent Light Paraffinic Distilled [1] | | 46 |
| Percent Soap | 8 | 8 |
| Oil Analysis: | | |
| Vis. SSU at 100° F | 3,940 | 545 |
| VI | 55.5 | 70 |
| API Grav | 21.2 | 23.6 |
| Avg. Mol. Wgt | 517 | 417 |

[1] Distilled, acid-treated, reduced dewaxed.

Soap analysis:
| | |
|---|---:|
| Percent H$_2$O | 1.0 |
| Percent TFA | 93.9 |
| Percent FFA | 5.2 |
| Percent IgR | 9.7 |
| Percent WSR | 1.0 |
| Percent IR | 8.8 |
| Titer, °C | 52 |
| IV | 5 |
| SV | 190 |

Tc (heavy oil), 140±5° F.
Tc (blend), 115±5° F.
Gel point (heavy oil), approx. 160° F.
Gel point (blend), approx. 150° F.

Figure 12:
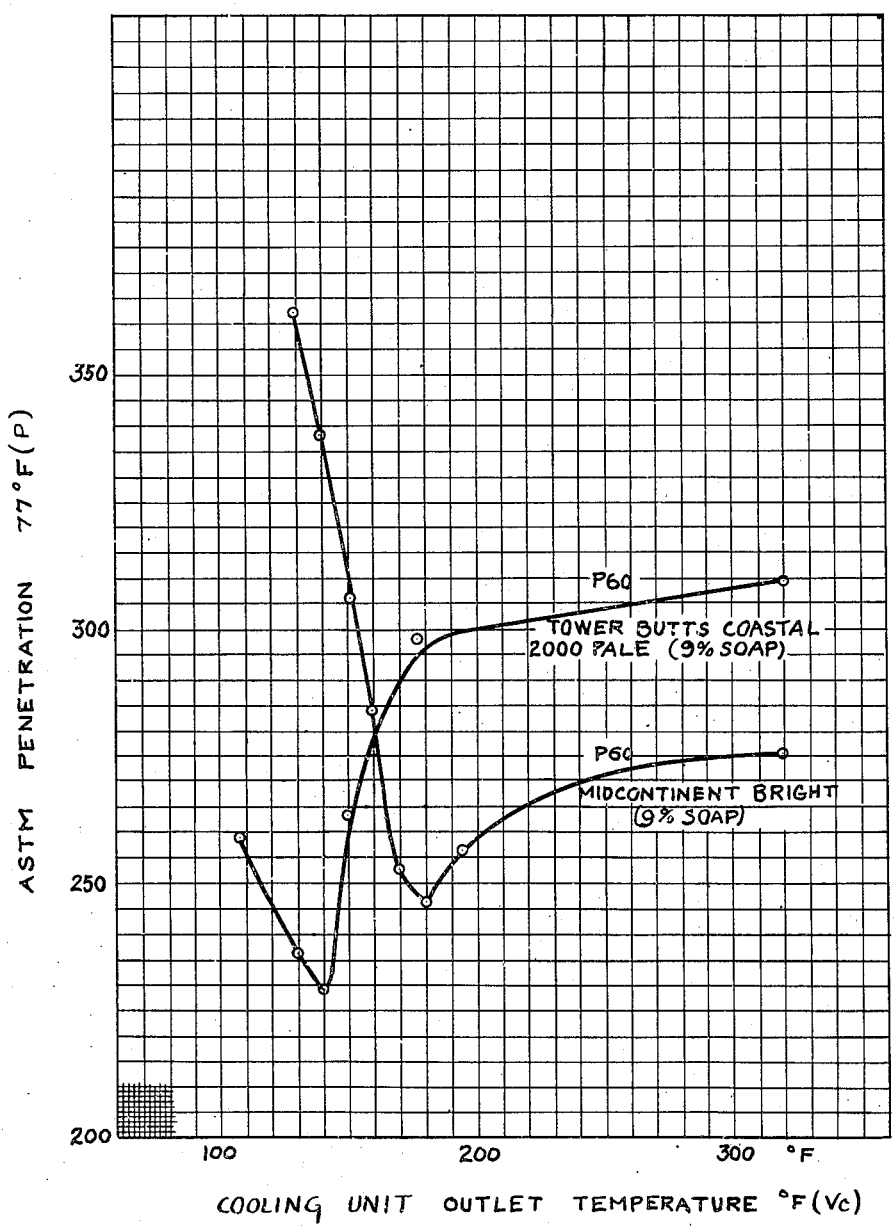

Figure 12 gives the comparative test results obtained with two oils which differ from one another in three respects, namely, source, refining treatment, and molecular weight. The oils were Mid-Continent Bright Stock and Tower Butts Coastal 2000 pale, the soap content in each case being 9%. These curves again demonstrate that the critical temperature will vary with the conditions in the particular case.

The data as to the greases of Figure 12 follows:

Figure 12

$T_C$ for heavy oil comparison. $P_{60}$-$V_C$ curve for two oils; different molecular weight.
Formula:
(1) Per cent Mid-Continent Bright Stock_____ 91
    Per cent soap_____ 9
(2) Per cent 2000 Pale Coastal Stock (Tower Butts)[1] ___ 91
    Per cent soap_____ 9

|  | Bright Stock | Coastal |
|---|---|---|
| Oil Analysis: | | |
| Vis SSU at 100° F | 4,050 | 1,740 |
| VI | 87 | 34 |
| API Grav | 21.4 | 22.9 |
| Avg. Mol. Wgt | 560 | 454 |

Soap analysis:
Per cent H₂O_____ 0.85
Per cent TFA_____ 94.80
Per cent FFA_____ 4.9
Per cent IgR_____ 9.8
Per cent WSR_____ 1.2
Per cent IR_____ 8.6
Titer, °C_____ 61.2
IV_____ 4.7
SV_____ 194

$T_C$ (Mid-Continent Stock), 180±5° F.
Gel point (Mid-Continent Stock), approx. 210° F.
$T_C$ (2000 vis. Coastal Stock), 140±5° F.
Gel point (Coastal Stock), approx. 180° F.

[1] 2000 pale oil, Tower Butts, filtered and dewaxed.

Figure 13:
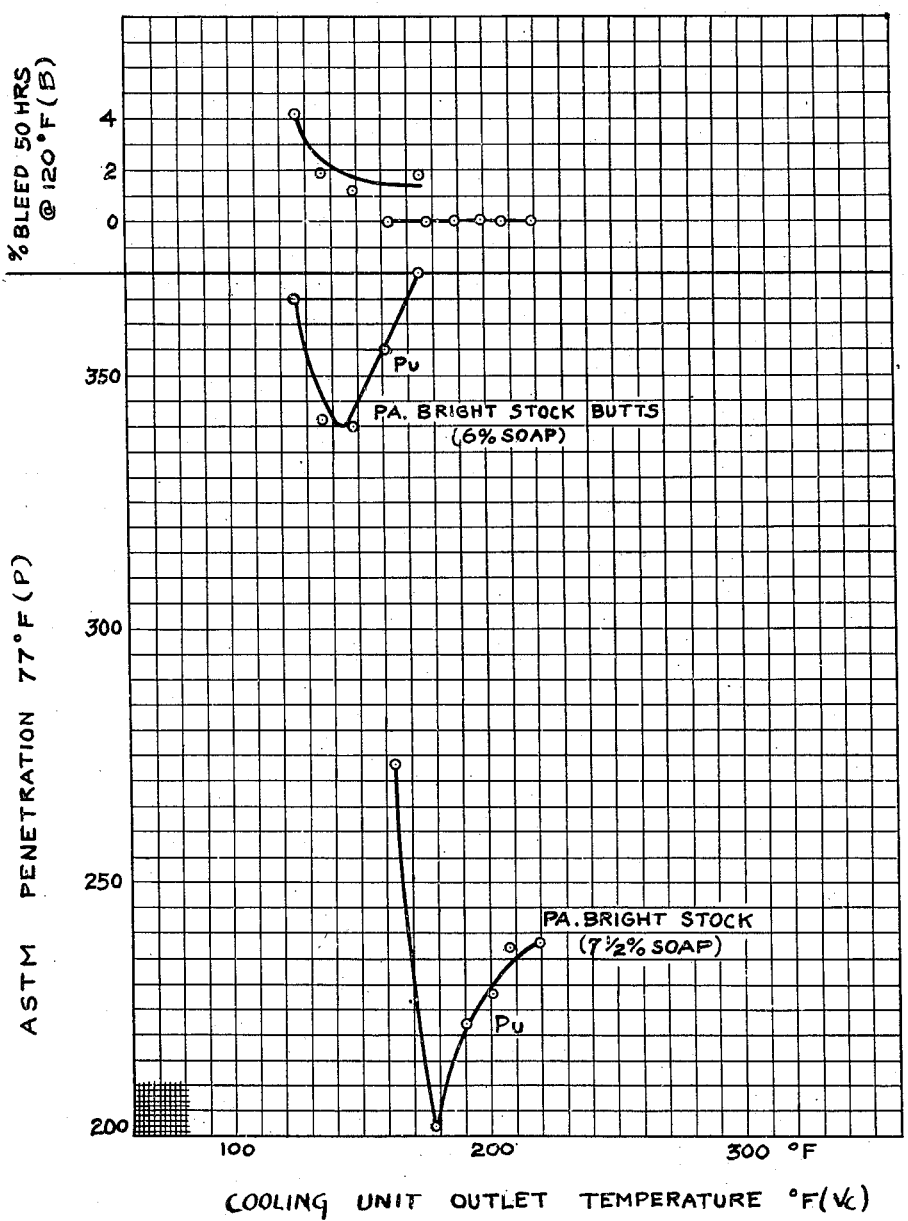

Figure 13 shows the comparative results obtained with two paraffinic oils from the same field, namely, Pennsylvania, the one being overhead distilled Bright Stock and the other being the Tower Butts from the same stock. These curves show that the impurities in the oil resulting from different refinery treatments markedly affect critical temperature.

Referring to the bleeding curves, what has heretofore been said in connection with Figure 10 applies.

Note that the critical temperature of the Tower Butts is substantially lower than the critical temperature of the Bright Stock, although the oil is from the same field.

There was a slight difference in the amount of soap, but this was not sufficient to materially affect the critical temperature.

The data as to the greases of Figure 13 follows:

Figure 13

$T_C$ for same stock but different refinery treatment—same mol wgt. $P_\omega$-$V_C$ and B-$V_C$ curves for two heavy paraffinic stocks.
Formula:
(1) Percent Pennsylvania oil Tower Butts from Bright Stock_____ 94
    Percent soap_____ 6
(2) Percent Pennsylvania oil Bright Stock_____ 92.5
    Percent soap_____ 7.5

|  | Tower Butts | Bright Stock |
|---|---|---|
| Oil Analysis: | | |
| Vis SSU at 210° F | 168.1 | 170.8 |
| VI | 98 | 108 |
| API Grav | 26.5 | 28.0 |
| Avg. Mol. Wgt | 552 | 549 |

Soap analysis:
Percent H₂O_____ 0.83
Percent TFA_____ 89.7
Percent FFA_____ 5.6
Percent IgR_____ 11.1
Percent WSR_____ 0.97
Percent IR_____ 10.1
Titer, °C_____ 50.7
IV_____ 3
SV_____ 202

$T_C$ (refined stock), 180±5° F.
Gel point, approx. 220° F.
$T_C$ (unrefined stock), 145±5° F.
Gel point, approx. 180° F.

Figure 14:
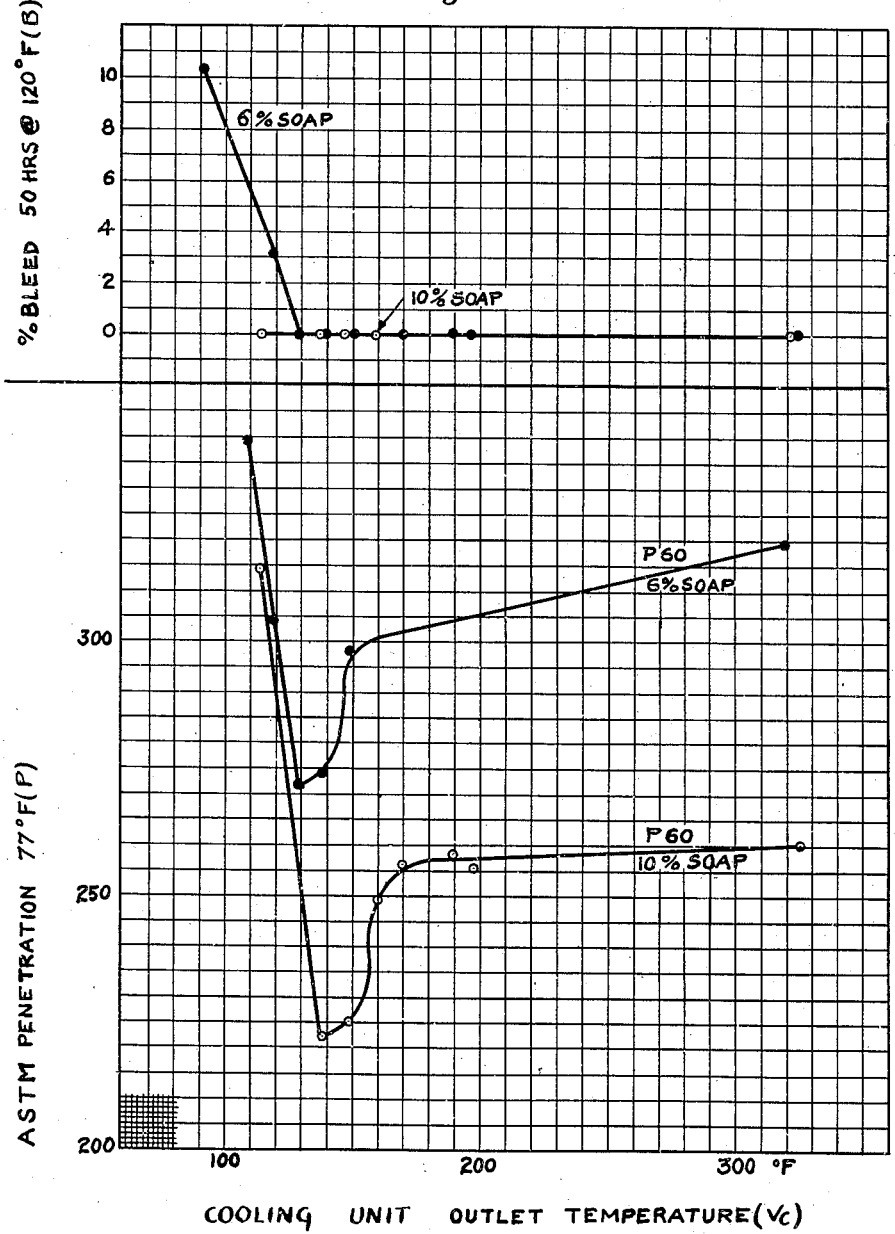

Figure 14 shows the effect on critical temperature of varying the percentage of soap in the making of grease from a Coastal Bright Stock. The critical temperature is raised about 10° F. for a 60% increase in soap. While the grease with 10% soap is much harder than the grease with 6% soap, nevertheless the curves demonstrate that for any given soap content maximum hardness is achieved by cooling through the transition temperature and to the critical temperature. As will be seen from the upper half of Figure 14, the particular grease was not sensitive to thermal shock and therefore may be cooled somewhat below the critical point, this being so particularly with respect to the grease with 10% soap.

The data as to the grease of Figure 14 follows:

Figure 14

$T_C$ for different soap concentration. $P_{60}$-$V_C$ and B-$V_C$ curves showing the shift in $T_C$ value for two soap concentrations.
Formula:
(1) Percent Coastal Bright Stock[1]_____ 90
    Percent soap_____ 10
(2) Percent Coastal Bright Stock_____ 94
    Percent soap_____ 6
Oil analysis:
Vis_____ 3940
VI_____ 56.5
API grav_____ 21.2
Avg. mol. wgt_____ 517
Soap analysis (same values as given for soap analysis in the above table of data for Fig. 11).
$T_C$ (10% soap), 140±5°F.
Gel point (10% soap), approx. 170°F.
$T_C$ (6% soap), 130° ± 5° F.
Gel point (6% soap), approx. 160°F.

[1] Overhead Bright Stock obtained by distilling, acid treating, reducing, and filtering Coastal crude.

Figure 15:
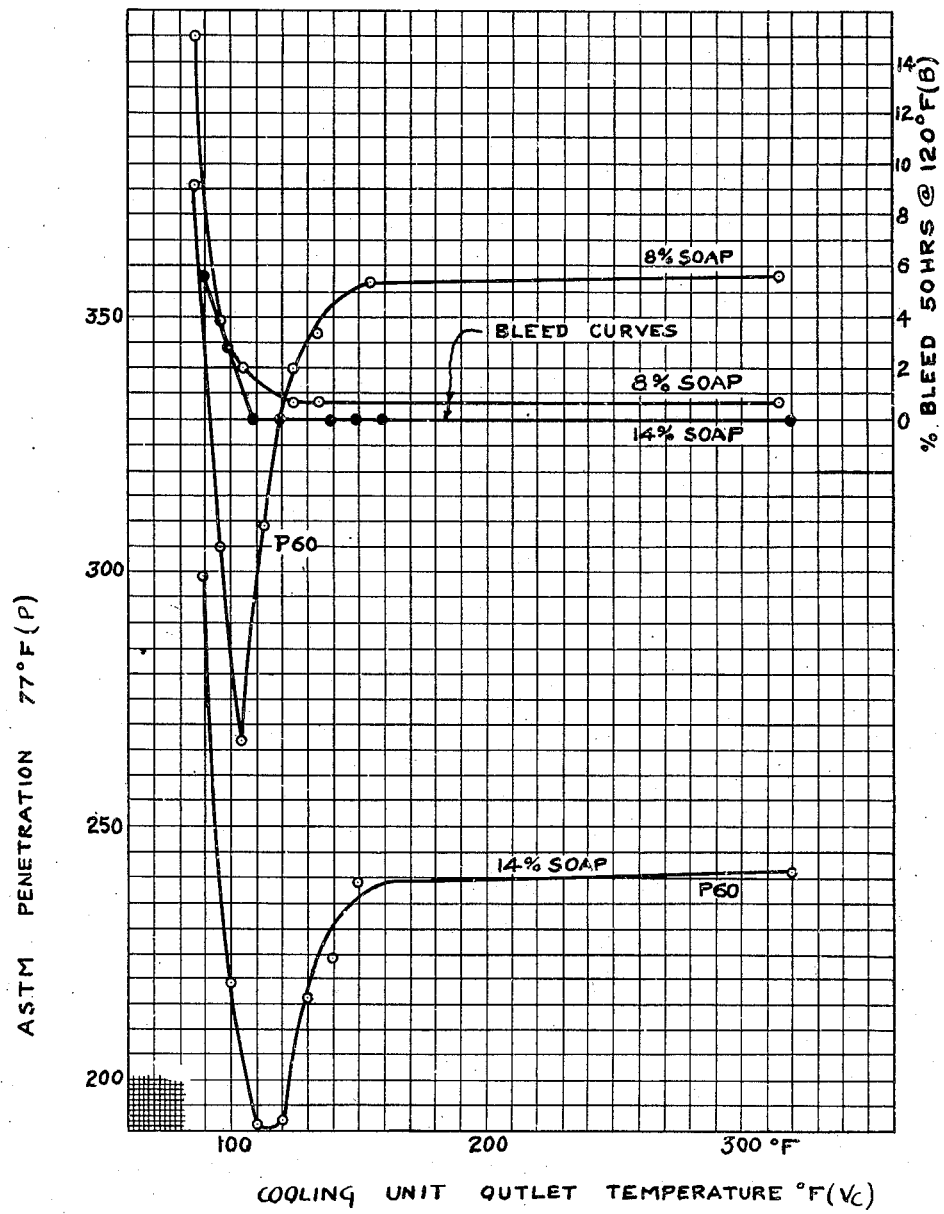

Figure 15 also shows the effect on critical temperature of varying the percentage of soap, the oil stock in this case being a light viscosity oil, 200 SSU at 100° F. Here, again, the light oil grease has a lower critical temperature. The increase in the soap content (approximately 57%) raised the critical temperature about 10° F. and lowered the penetration, as well as tending to overcome sensitivity to thermal shock brought about by using air cooled beaker samples, as hereinbefore set forth. The bleed curves would have moved to the left had the samples been isothermally gelled.

The data as to the greases of Figure 15 follows:

Figure 15

$P_{60}$-$V_C$ and B-$V_C$ curves for two soap concentrations with light vis. oil.
Formula:
Per cent light vis. oil_____ 92  86
Per cent soap_____ 8  14
Oil analysis:
Vis. SSU at 100° F_____ 213
VI_____ 116
API grav_____ 26.2
Avg. mol. wgt_____ 391
Soap analysis:
Per cent H₂O_____ 0.72
Per cent TFA_____ 90.5
Per cent FFA_____ 4.0
Per cent IgR_____ 9.8
Per cent WSR_____ 1.4
Per cent IR_____ 8.4
Titer, °C_____ 62
IV_____ 3
SV_____ 198

$T_C$ for 8 per cent soap, 105° F.
Gel point, approx. 155° F.
$T_C$ for 14 per cent soap, 118° F.
Gel point, approx. 155° F.

Figure 16:
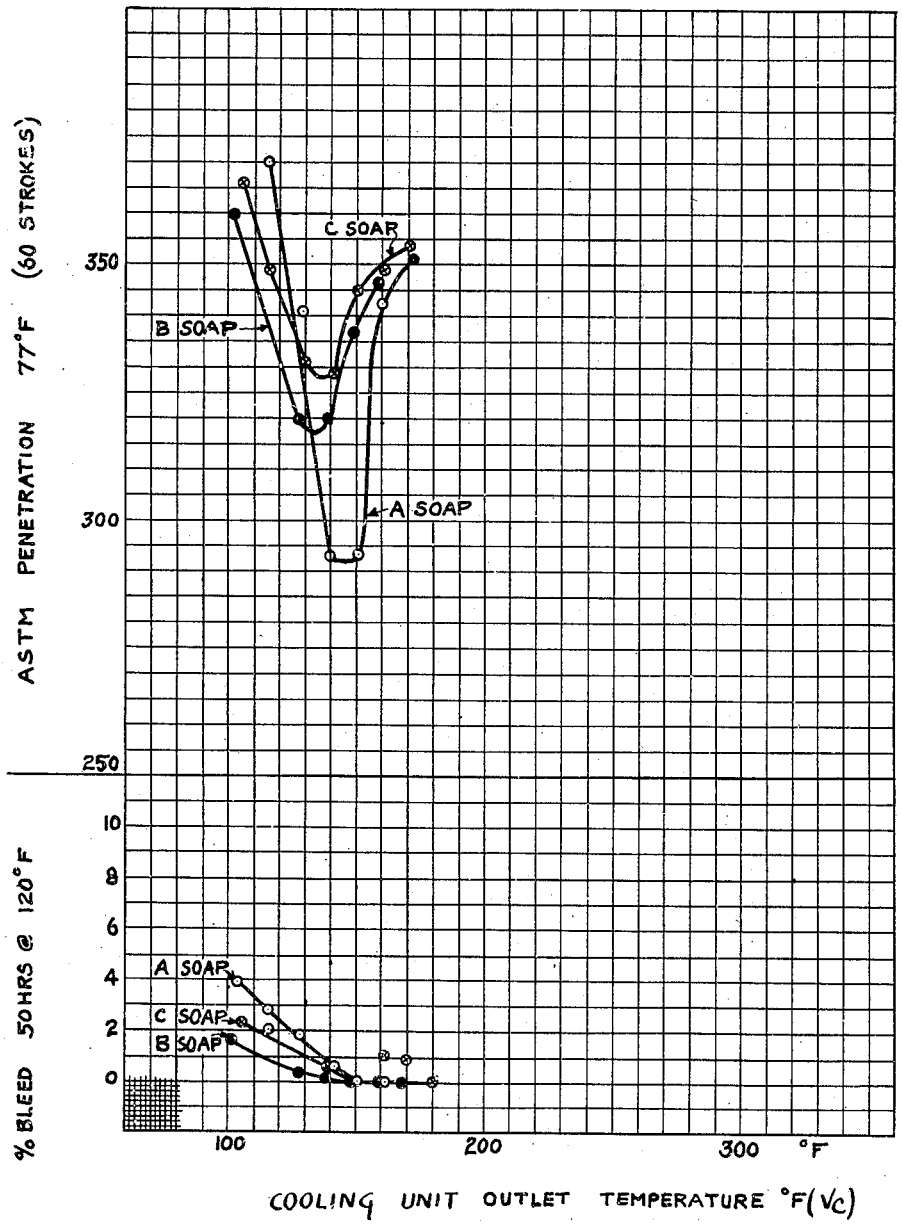

Figure 16 is illuminating as showing the effects of aluminum soaps manufactured and sold for grease making. The soaps were obtained from different sources. Soap A is obviously the best for yield. The soap giving the poorest yield is soap C, which also leads to the least stable grease. Apparently the difference in results is to be attributed more to the fatty acids used than to the manufacturing methods. However this may be, the curves show the effect of differences encountered in even one type of soap, in this case aluminum soap, on critical temperature and penetration, as well as bleed.

The data as to Figure 16 follows:

Figure 16

Tc for various commercial soaps. $P_{60}$-Vc and B-Vc for three commercial soaps.

Formula:
| | |
|---|---:|
| Percent heavy oil [1] | 94 |
| Percent soap | 6 |

Oil analysis:
| | |
|---|---:|
| Vis. SSU at 210° F | 126 |
| VI | 63 |
| API grav | 23.7 |
| Avg. mol. wgt | 550 |

| | A | B | C |
|---|---|---|---|
| Soap analysis: | | | |
| Per cent H₂O | 0.4 | 0.98 | 0.6 |
| Per cent TFA | 91.6 | 89.4 | 89.2 |
| Per cent FFA | 7.4 | 7.6 | 8.2 |
| Percent IgR | 9.8 | 11.6 | 9.4 |
| Per cent WSR | 0.8 | 1.3 | 0.8 |
| Per cent IR | 8.9 | 10.3 | 8.6 |
| Titer, °C | 47.4 | 51.2 | 52.0 |
| IV | 6.0 | 3.5 | 5.0 |
| SV | 214.0 | 199 | 192 |
| Tc | 145 | 140 | 135 |
| Gel Point (approx.) | 170 | 170 | 170 |
| Penetration minimum | 292 | 318 | 328 |

[1] Mid-Continent.

Figure 17:
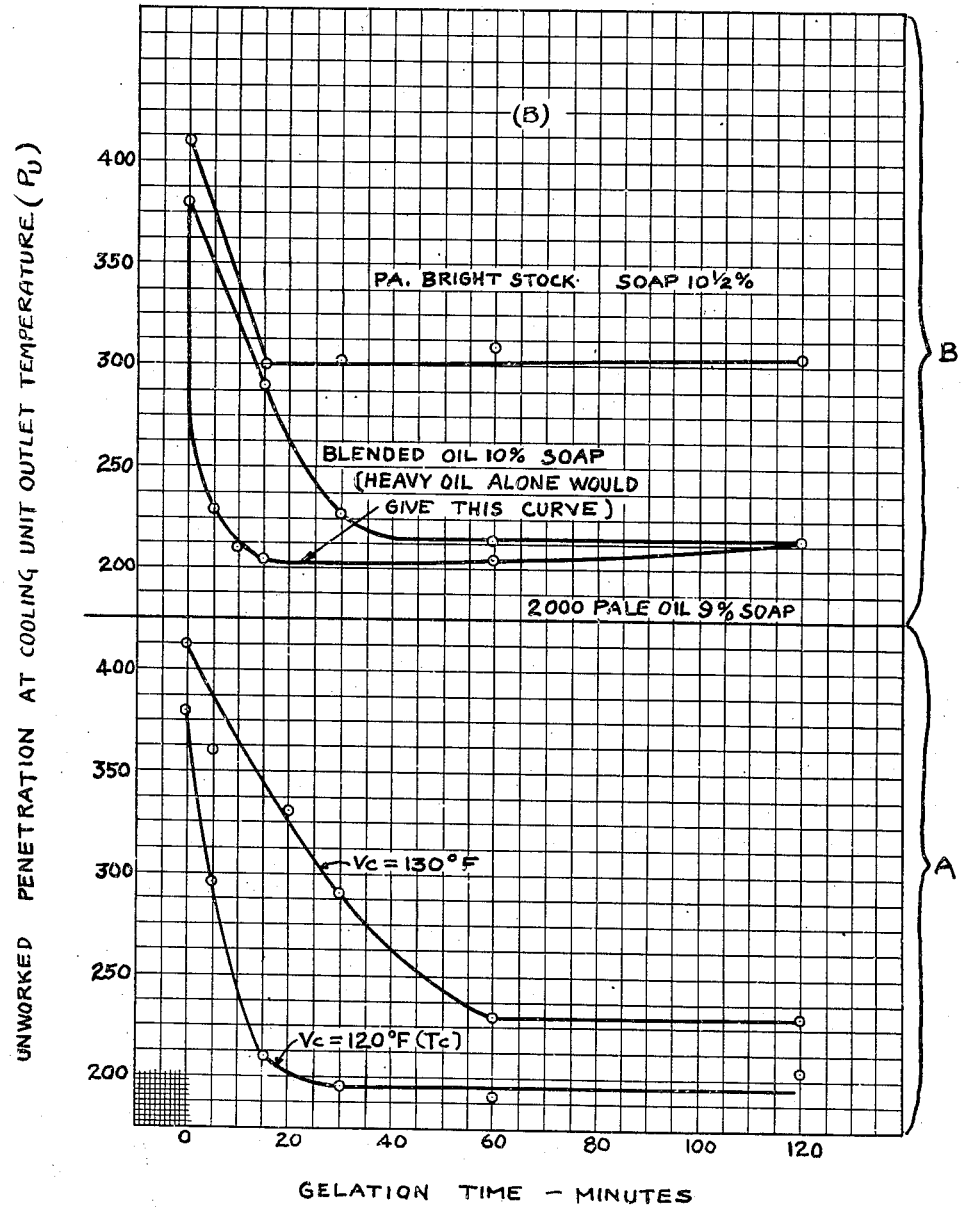

In the graphs of Figure 17, samples of grease taken directly from the cooler were placed in an oven maintained at the same temperature as the grease leaving the cooler so as to obtain isothermal gelling. At fixed time intervals, samples were removed from the oven and a penetration taken in order to observe the rate of gelling.

The lower half A of Figure 17 compares the gel times for the same grease at two temperatures. One temperature is the critical temperature of 120° F. for that grease, and the other is 10° above the critical temperature. The comparison shows, first, that the gelled grease made at 10° F. above the critical temperature is soft and that, therefore, the yield is poor. Secondly, this same grease takes four times as long to gel—about 60 minutes as compared to about 15 minutes. Longer gelling requires bulky equipment since greater storage space is needed in a continuous plant, to allow for the longer gelling time.

The upper half B of Figure 17 illustrates the times, etc., as in the lower half but for three different oils and soaps. The main point of interest is the long gelling time of the blended stock shown in B. This shows that light viscosity oils have a lower critical temperature and a longer gelling time than the heavy oils. Using the same soap with a straight Coastal Bright Stock shows the gel to set in about 15 minutes.

The data as to Figure 17 follows:

Figure 17

The unworked penetration of hot grease as a function of gel time:
Part A.—Shows the gelation time respectively at the critical temperature and at 10° F. above, for a given soap and oil.
 Oil analysis (same as given in above table of data for Fig. 15)
 Soap analysis (same as given in above table of data for Fig. 15)
Part B.—Shows the gelation time at the critical temperature for three different oils and soaps.
 Oil analysis:
  Curve A (same as for oil of Fig. 9 above)
  Curve B (same as for blended oil of Fig. 11 above)
  Curve C (same as for Coastal oil of Fig. 12 above)
 Soap analysis:
  Curve A (same as for soap of Fig. 9 above)
  Curve B (same as for soap of Fig. 11 above)
  Curve C (same as for soap of Fig. 12 above)

The above curves show the gelation time for various oils, blends, soaps and soap contents, etc., when the conditions of test are the same.

There are other factors which affect critical temperature, and which, therefore, must be taken into consideration, namely, through-put rate, shaft R. P. M. and horsepower input, since all of these affect the temperature gradient in the grease films forming on the heat transfer wall of the cooler and which, as stated, are continuously being scraped off and mixed with the remainder of the mixture in the thin confined layer of material undergoing cooling. Such other factors, however, are of relatively minor importance as compared with the previously discussed factors of soap and oil characteristics and formulation.

Figures 18 to 25 inclusive illustrate the effects on critical temperature of the other factors referred to in the immediately preceding paragraph. These figures are diagrammatic and are based upon theoretical calculations, and Figures 18, 20, 22 and 24 are drawn on grossly exaggerated and distorted scale. It is to be understood that these figures are included only for purposes of illustrating certain theories believes to be involved and which may be helpful in conveying an understanding of the invention, but it is not intended that my invention be limited either by those figures or by the ensuing theoretical discussion concerning the same.

Figure 18:
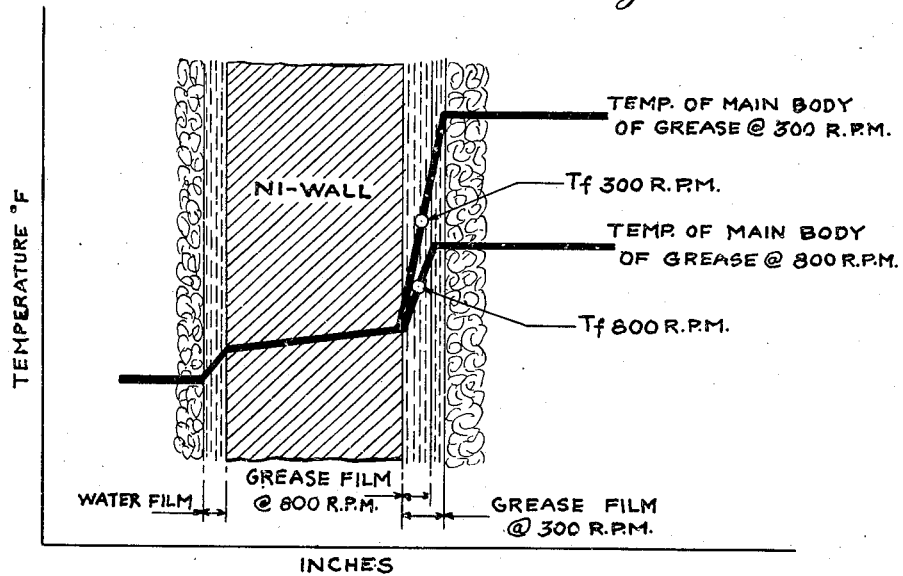
Figure 19:
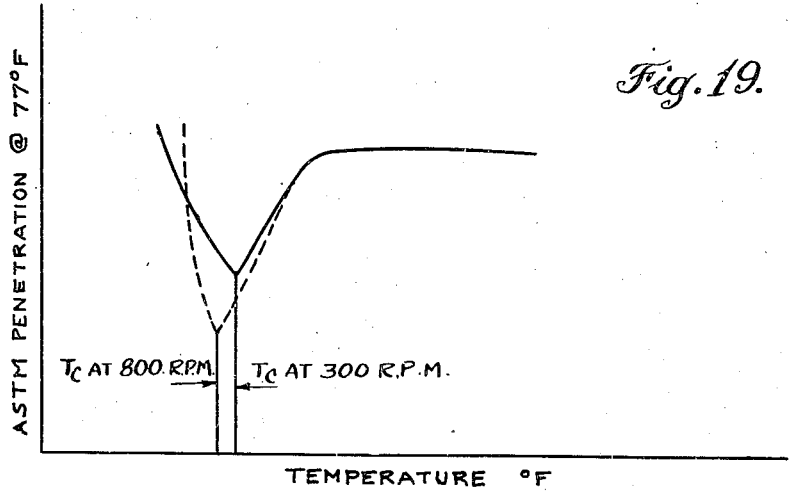

Referring to Figure 18, the nickel heat transfer wall is shown with the cooling water on the outside (left) and the grease layer on the inside (right). There will be a very, very thin film of water immediately next the wall, the main body of water being turbulent. On the other side there will be a very, very thin film of grease next to the wall, which will vary in thickness as will appear, and the main body of the grease in the thin layer being cooled in the cooler will be turbulent, as indicated.

Figure 18 illustrates the situation where the film is constant, i. e., the water rate and the temperature are maintained constant. On the grease side the through-put rate is constant but the shaft speed is increased, say from 300 to 800 R. P. M. The assumption also is made that the material is of a low enough viscosity that there is little increase in heat generated by the increased power input to the shaft, when operating at the higher speeds. Stated in another way, the material is of such low viscosity that the change in speed from low to high introduces negligible friction and, therefore, negligible internal heat factors.

The figure shows that the grease temperature is lower when using 800 R. P. M. than when using 300 R. P. M. and that the average temperature, $T_f$, of the grease film is also lower. Obviously, the critical temperature is that exhibited by the main body of the grease while the temperature which affects stability is the average film temperature. Consequently, the Vc (cooling) curve takes on the appearance of Figure 19. This curve shows that in those cases where power is negligible, high shaft speed will produce a harder grease for a given temperature and, therefore, will also lead to a lower critical temperature. The assumptions made in the calculation of this case where only the speed of the shaft is changed, are (a) grease rate constant; (b) water rate constant; (c) water temperature constant; (d) water input increased only slightly with increased R. P. M., and (e) inlet grease temperature constant.

It will be noted that the critical temperature (Tc) is lower, under these conditions, when operating at 800 revolutions than it is when operating at 300 revolutions per minute.

Had the grease been more viscous the R. P. M. should be reduced to arrive at the critical temperature and optimum conditions as will be discussed hereinafter in connection with Figure 22.

Figure 20:
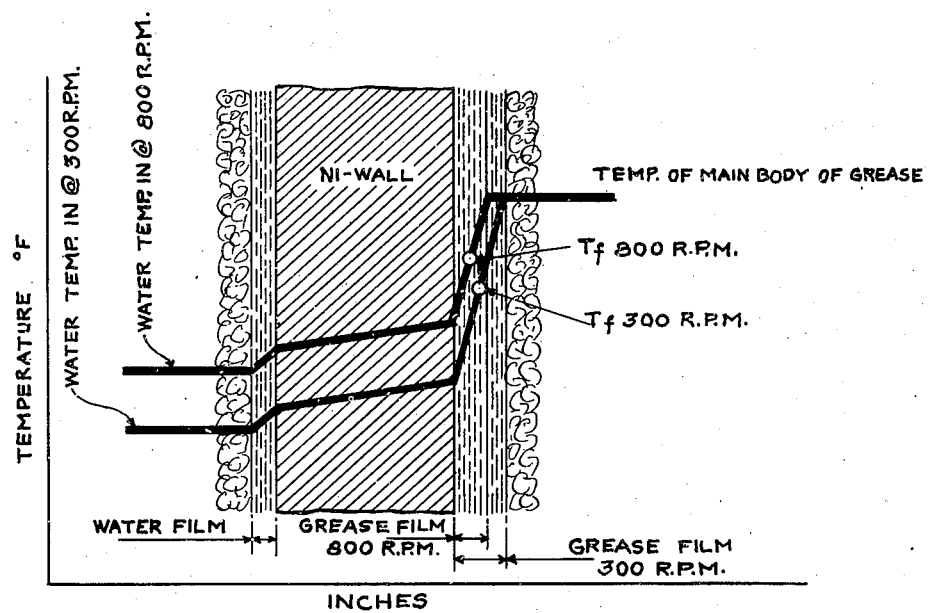
Figure 21:
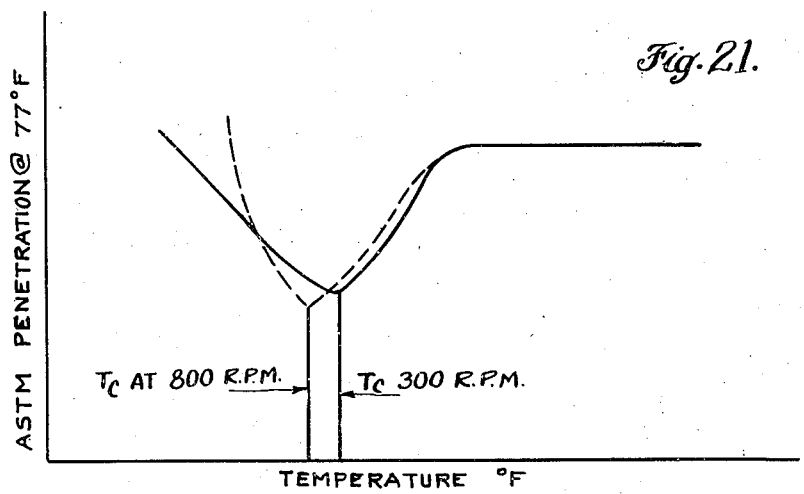

Referring now to Figure 20, this is an illustration of the case where (a) the grease rate is constant; (b) the water rate is constant; (c) power is negligible on increasing the shaft from 300 to 800 R. P. M.; (d) the inlet grease temperature is constant, and (e) the outlet temperature of the grease is the same, irrespective of whether operating at 300 or 800 R. P. M. In this case, the inlet temperature of the water must be increased to compensate for the increased heat transfer obtained with the higher shaft speeds. It will be observed that the average film temperature of the grease made at 800 R. P. M. is higher and therefore more stable than that made at 300 R. P. M. The corresponding Vc curve is, therefore, as shown in Figure 21. The grease is nearly of the same consistency but due to the fact that the film temperature of the grease made at 800 R. P. M. is higher, it allows this grease to go to a lower temperature before bleed starts.

Figure 22:
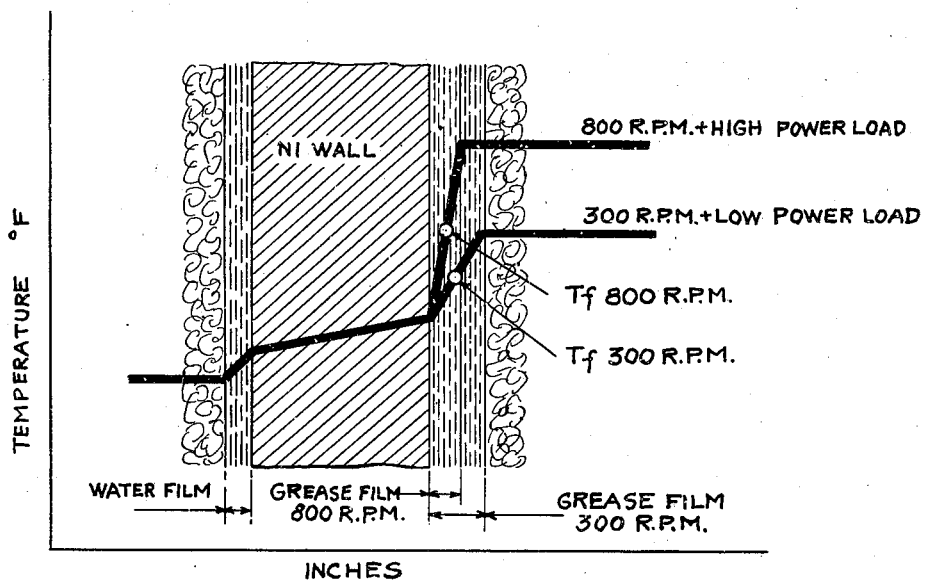
Figure 23:
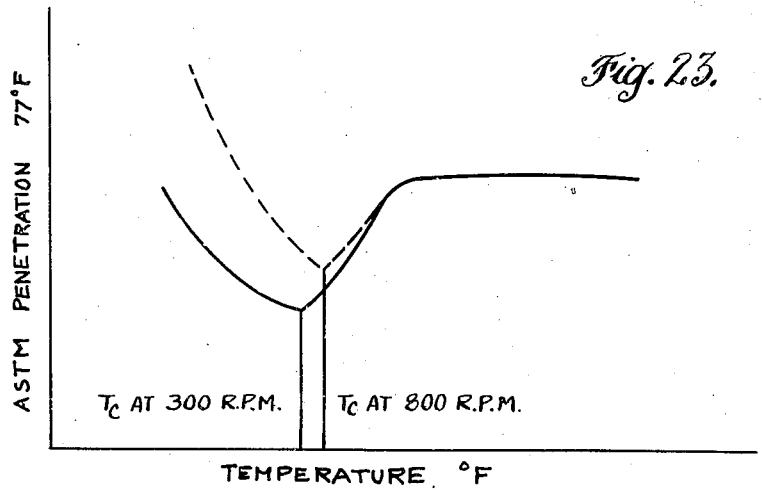

Figure 22 illustrates the case where the grease is so stiff that speeding up of the shaft causes appreciable heat input into the grease. In this instance, the temperature of the grease made at 800 R. P. M. (making the same assumptions as in the case of Figure 18) is above that made at 300 R. P. M. Therefore, the curve for critical temperature is as shown in Figure 23 and the 300 R. P. M. will give a better yield of grease than the 800 R. P. M. grease, with lower critical temperature.

Figure 24:
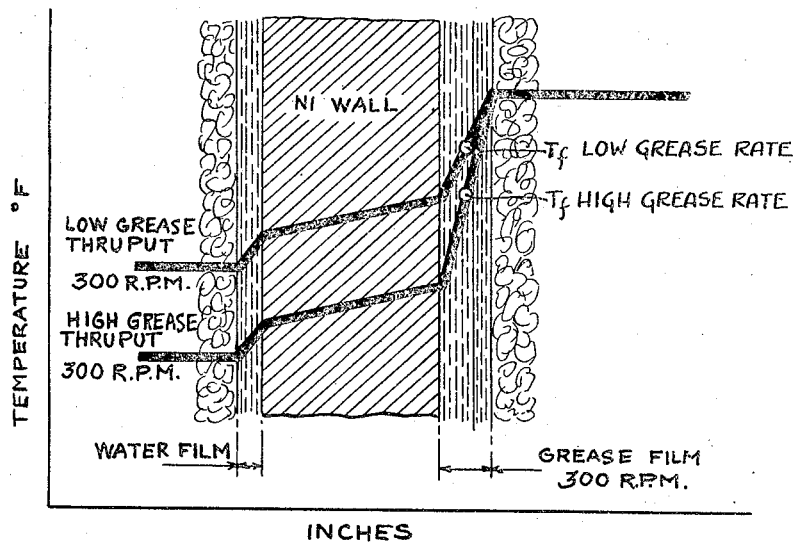
Figure 25:
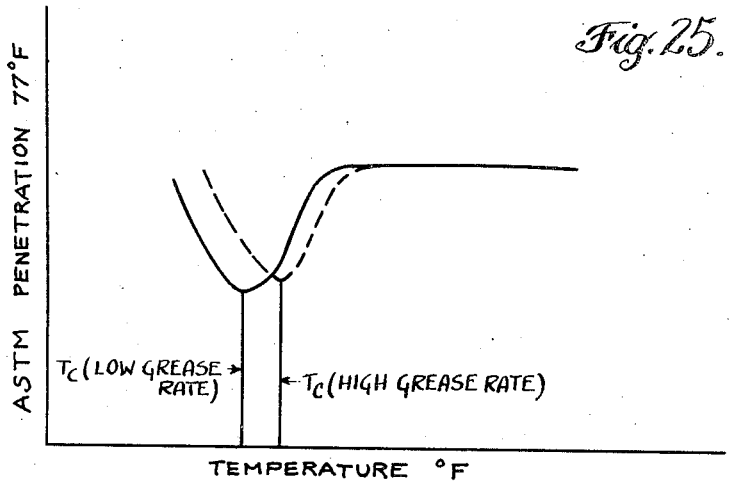

Figure 24 illustrates the case of two grease rates, one twice the other. The water rate, the R. P. M., and the grease inlet and outlet temperatures are held constant in both cases. With the higher through-put rates, though a higher overall coefficient is obtained, it still necessitates a lowering of the inlet water temperature to maintain the same outlet grease temperature. The corresponding critical temperature curve is ilustrated in Figure 25. Moreover, if power is a major factor, here the curves can shift with respect to one another and the higher rate grease can be both harder and have a lower critical temperature.

Thus Figures 20 to 25 show that the critical temperature is also affected by the through-put rate, the shaft R. P. M., and the horsepower input factors.

With the foregoing as a guide, it will be seen that a pilot plant may be used to ascertain the critical temperature for any particular grease for any given set of conditions. Under one set of conditions, for example, the critical point will be arrived at at a lower or a higher temperature than under another set of conditions, for the same grease. If, for example, one desires to increase the rate of through-put, for a given grease, it can be readily determined what adjustments in operation are required to give the optimum results for that increased through-put, and so on. In all cases it will be found that the critical temperature is substantially lower than the transition temperature, and that optimum results will always be obtained when cooling rapidly, with agitation, to a point near to, or to, or in some cases beyond, the ascertained critical temperature.

When the critical temperature for any given grease has been thus ascertained by the pilot plant, the production plant is designed and operated accordingly. As previously mentioned, in the carrying out of the pilot plant investigations hereinbefore discussed, there was employed a pilot plant cooler having a cylindrical chamber 3" in internal diameter and 12" long, with the confined layer of material, ⅜" thick. In production, coolers approximately 10" in internal diameter and 5' long, with a confined layer of material approximately ¾" in thickness, have been very satisfactorily employed, but coolers of other dimensions may be employed depending upon the production capacity desired and other practical plant considerations.

If in a given case, the optimum results are obtained in the pilot plant under certain ascertained conditions, then the commercial plant can be made to operate under conditions that will produce substantially the same optimum results. Merely by way of illustration, if the optimum results are obtained in the pilot plant at 300 R. P. M., the commercial plant will be operated at slower R. P. M. because if run at the same R. P. M., the peripheral speed per second of the scraper blade tips will be too great. By adjusting the speed and the cooling medium in relation to the lbs. per hour per square foot of cross section, the same optimum results can be readily attained.

Generally speaking, I have found that with a 10" diameter cooling unit of the kind herein described and illustrated a speed of approximately 100 to approximately 300 R. P. M. will satisfactorily meet most conditions ordinarily encountered in commercial practice. In the claims, in which I employ the figures 100 to 300, it will be understood that I am speaking of such a commercial plant. Rates of cooling greater than ½° drop per second are desirable. With the apparatus above mentioned, rates of about 1° to about 3° drop per second are easily and generally obtained and usually are satisfactory in commercial operation. It is possible to achieve higher rates, even up to 5° per second and more. If cooling rates lower than those above mentioned are employed, the critical point may too closely approach the transition point, so that the yield may drop to an undesirable value and the overall results may be unsatisfactory.

Expressed in another way, in the practice of my invention it is desirable to employ cooling equipment having an overall heat transfer coefficient (in the sense usually employed and generally understood in the art) of not less than 50 B. t. u./(hr.) (ft.$^2$) (°F.) and higher. With the apparatus hereinbefore referred to, overall heat transfer coefficients in the range of about 125 to about 200 B. t. u./(hr.) (ft.$^2$) (°F.) are generally obtained in the practice of my present invention, and even higher coefficients, up to around 500 B. t. u./(hr.) (ft.$^2$) (°F.) have been obtained in some instances.

Were it possible to instantaneously cool from the transition temperature without agitation, theoretically the critical temperature might be much lower than herein indicated. It is impossible to do this in commercial operations where the limitations of mechanical equipment necessitate simultaneously agitating while cooling. I, therefore, use the term "critical temperature" in relation to the cooling instrumentality. The heating and cooling units herein described and illustrated are capable of extremely high rates of heat transfer. Hence, in certain of the claims herein, I have referred to rates of heat transfer at least such as are obtained with a 10" diameter unit operating from approximately 100 R. P. M. to approximately 300 R. P. M.

In the various curves hereinbefore discussed, the critical temperature has been given as plus or minus 5, to indicate that the air cooling of beaker samples upon which the curves were based is not completely accurate, particularly in cases where greases sensitive to thermal shock in gelation are being made. As hereinbefore indicated, the critical temperature may be more accurately arrived at by cooling the samples isothermally, and by taking more values around the critical temperature.

Referring again to the curves in which there is a wide spread in penetration or hardness as between $P_u$ and $P_{60}$, this is an indication of false set. This false set is cured by isothermal gelation and further working after gelling.

The grease obtained in practicing my process is buttery in character and of stable consistency. The consistency is also uniform. It will be seen that the dispersion is maintained uniform to the last instant, so to speak, which tends to secure uniformity of consistency in the gelation which, as hereinbefore pointed out, requires a relatively shorter period as contrasted with customary practice. The amount of material in the process under heat is usually in the neighborhood of from 50 to 60 lbs. at any time in contrast to thousands of pounds in customary practice. Nevertheless, because the process is continuous, production output is high.

What I claim is:

1. In a process of manufacturing grease from oil and a stiffening agent, including the provision of a hot grease of the desired composition, the steps of agitating said grease while simultaneously uniformly cooling the same at a rate sufficiently rapid to lower the temperature of the grease through and substantially below the transition temperature thereof and to substantially the critical temperature, as herein defined, before any substantial gelation of the grease can occur, said rate being in excess of ½° F. per second with an overall heat transfer coefficient of the cooling operation being at least 50 B. t. u./(hr.) (ft.$^2$) (°F.), and then allowing the cooled grease to gel without appreciable agitation.

2. In the manufacture of grease wherein a hot grease of desired composition is first produced, the continuous method which comprises substantially continuously supplying the hot grease to and passing it through a cooling zone, cooling said grease therein at a rate in excess of ½° F. per second, the overall coefficient of heat transfer of the cooling operation being at least substantially 50 B. t. u./(hr.) (ft.$^2$) (°F.), while simultaneously agitating the grease, the cooling and agitating being continued until the grease has been cooled not only to the transition temperature of the particular composition of grease being manufactured but also below that temperature substantially to the critical temperature as herein defined, which latter temperature is substantially below the said transition temperature, continuously discharging said cooled grease from said cooling zone, and then allowing the discharged grease to gel without appreciable agitation.

3. The process for the manufacture of grease which comprises providing a hot grease of oil and a stiffening agent, and continuously and rapidly flowing said hot grease as a relatively thin confined layer through a zone having a heat-transfer wall, cooling said thin layer in said zone through said wall, while simultaneously continuously and rapidly removing films from said wall independently of said operation of flowing the grease through said zone, and rapidly and continuously moving the removed films inwardly and mixing the same with the remainder of said mixture in said thin layer, whereby substantially continuously to bring relatively fresh material to said transfer wall and thereby to effect extremely rapid cooling of said mixture in said layer to a uniform temperature and to maintain a thorough and intimate dispersion of the stiffening agent and oil, and continuously discharging the cooled grease from said zone.

4. The process for the manufacture of grease which comprises providing a hot grease of oil and a stiffening agent, and continuously and rapidly flowing said grease as a relatively thin confined layer through a zone having a heat-transfer wall, cooling said thin layer in said zone through said wall for gelation purposes, while simultaneously continuously and rapidly scraping films from said wall independently of said operation of flowing the grease through said zone, and rapidly and continuously moving the removed films inwardly and mixing the same with the remainder of said mixture in said thin layer, whereby substantially continuously to bring relatively fresh material to said transfer wall and thereby to effect extremely rapid cooling of said mixture in said layer to a uniform temperature and to maintain a thorough and intimate dispersion of the stiffening agent and oil, and continuously discharging the cooled grease from said zone; the cooling being to a temperature below that at which the stiffening agent is soluble in the oil.

5. The process for the manufacture of grease which comprises providing a hot grease of the oil and a stiffening agent, and continuously and rapidly flowing said grease as a relatively thin confined layer through a zone having a heat-transfer wall, cooling said thin layer in said zone through said wall for gelation purposes, while simultaneously continuously and rapidly scraping films from said wall independently of said operation of flowing the grease through said zone, and rapidly and continuously moving the removed films inwardly and mixing the same with the remainder of said mixture in said thin layer, whereby substantially continuously to bring relatively fresh material to said transfer wall and thereby to effect extremely rapid cooling of said mixture in said layer to a uniform temperature and to maintain a thorough and intimate dispersion of the stiffening agent and oil, the cooling being to a temperature below that at which the stiffening agent is soluble in the oil, continuously discharging the cooled grease from said zone; thereafter allowing the cooled grease to gel by passing the same into a space of relatively large cross-section to provide a time lag for gelation, and then discharging the gelled grease from said space and working the gelled grease.

6. The process for the manufacture of grease which comprises providing a hot grease of oil and a stiffening agent and continuously and rapidly flowing said grease as a relatively thin confined layer through a zone having a heat-transfer wall, cooling said thin layer in said zone for gelation purposes, while simultaneously continuously and rapidly scraping films from said heat-transfer wall and rapidly and continuously mixing the same with the remainder of said mixture in said thin layer whereby substantially continuously to bring relatively fresh material to said transfer wall and thereby to effect extremely rapid cooling of said mixture in said layer to a uniform temperature and to maintain a thorough and intimate dispersion of the stiffening agent and oil, the cooling being to a temperature below that at which the stiffening agent is soluble in the oil, continuously discharging the cooled grease from said zone; thereafter allowing the cooled grease to gel by passing the same into a space of relatively large cross-section to provide a time lag for gelation, discharging the gelled grease from said space, and then further cooling the same simultaneously with working.

7. In the manufacture of grease from mineral oil and similar lubricating vehicles and a stiffening agent wherein a hot grease of the desired composition is provided, the process of increasing the "yield" which consists in uniformly cooling the hot grease while simultaneously agitating the same to and below the transition temperature of the particular grease at a rate in excess of ½° F. per second with an overall heat transfer coefficient of at least 50 B. t. u./(hr.) (ft.$^2$)(°F.) whereby the grease may be cooled within the range between the transition temperature and the critical temperature, as herein defined, and agitated before the grease attains the gelled state, such cooling and agitation being continued to a temperature at least between the transition temperature and the critical temperature and nearer to the latter, and then allowing the cooled grease to gel without appreciable agitation.

8. The process of claim 7 in which the grease, after gelation thereof, is worked and simultaneously further cooled.

9. The process of claim 7 in which the cooled grease is gelled isothermally.

HAROLD G. HOULTON.

REFERENCES CITED

The following references are of record in the file of this patent:

UNITED STATES PATENTS

| Number | Name | Date |
|---|---|---|
| 2,084,974 | Kaufman | June 22, 1937 |
| 2,222,589 | Bradley | Nov. 26, 1940 |
| 2,257,945 | Fraser | Oct. 7, 1941 |
| 2,298,317 | Smith | Oct. 13, 1942 |
| 2,318,668 | Calkins | May 11, 1943 |
| 2,319,405 | Ittner | May 18, 1943 |
| 2,332,202 | Calkins | Oct. 19, 1943 |
| 2,339,873 | Morway et al. | Jan. 25, 1944 |
| 2,343,736 | Beerbower et al. | Mar. 7, 1944 |
| 2,365,037 | Zimmer et al. | Dec. 12, 1944 |
| 2,372,052 | Beerbower et al. | Mar. 20, 1945 |

Certificate of Correction

Patent No. 2,483,282                                                      September 27, 1949

HAROLD G. HOULTON

It is hereby certified that errors appear in the printed specification of the above numbered patent requiring correction as follows:

Column 11, line 21, after "100° F." strike out the word *oil* and insert the same in line 25, after "100° F."; column 15, line 45, for "gelled" read *cooled with agitation*; line 51, under the heading "Figure 10", for "there" read the syllable and hyphen ther-; column 18, Figure 14, second line of the formula, for "Percent soap_____90" read *Percent soap_____10*; column 19, line 50, for "in B" read *in curve B*; column 20, line 18, for "believes" read *believed*; line 36, before "film" insert *water*; column 22, line 69, after "units" insert *of the kind*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*